US012566077B2

(12) United States Patent
Nutakki et al.

(10) Patent No.:  US 12,566,077 B2
(45) Date of Patent:  Mar. 3, 2026

(54) METHOD AND APPARATUS FOR DEVICE PROBE POINT DATA OBJECT DETERMINATIONS AND VALIDATIONS

(71) Applicant: HERE GLOBAL B.V., Eindhoven (NL)

(72) Inventors: Swetha Bose Nutakki, Khajaguda (IN); Nandhi Prabhu Mohan, Naperville, IL (US); Corinne Bradley, Chicago, IL (US); Arnold Sheynman, Northbrook, IL (US)

(73) Assignee: HERE GLOBAL B.V., Eindhoven (NL)

( * ) Notice: Subject to any disclaimer, the term of this patent is extended or adjusted under 35 U.S.C. 154(b) by 338 days.

(21) Appl. No.: 18/147,572

(22) Filed: Dec. 28, 2022

(65) Prior Publication Data

US 2023/0204382 A1    Jun. 29, 2023

(30) Foreign Application Priority Data

Dec. 29, 2021    (IN) .............................. 202111061612

(51) Int. Cl.
| | |
|---|---|
| *G06F 16/00* | (2019.01) |
| *G01C 21/00* | (2006.01) |
| *G08G 1/01* | (2006.01) |

(52) U.S. Cl.
CPC ........... *G01C 21/3841* (2020.08); *G08G 1/01* (2013.01)

(58) Field of Classification Search
CPC ....... G06F 11/14; G01C 21/3841; G08G 1/01; G08G 1/052; G08G 1/0129; G08G 1/0112
See application file for complete search history.

(56) References Cited

U.S. PATENT DOCUMENTS

| | | | | |
|---|---|---|---|---|
| 6,760,770 B1 * | 7/2004 | Kageyama | .............. | H04L 67/52 |
| | | | | 709/225 |
| 8,217,777 B2 * | 7/2012 | Sekiyama | .............. | G08G 1/127 |
| | | | | 340/459 |

(Continued)

FOREIGN PATENT DOCUMENTS

| | | | | |
|---|---|---|---|---|
| CN | 111653091 A | * | 9/2020 | ........... G08G 1/0133 |
| JP | 6672077 B2 | | 3/2020 | |

OTHER PUBLICATIONS

Examination Report for Indian Application No. 202111061612 dated Mar. 18, 2024, 6 pages.

(Continued)

*Primary Examiner* — Noosha Arjomandi

(74) *Attorney, Agent, or Firm* — ALSTON & BIRD LLP

(57)    ABSTRACT

A method, apparatus and computer program product are provided to determine one or more probe point data objects and/or validate one or more probe point data objects for use with determination of traffic conditions. A determined probe point data object may be determined and/or updated with one or more probe point data objects which exclude any probe point data objects determined to correspond to an off-road location. A validated probe point data object may additionally or alternatively be determined using one or more first validation sequence check operations and using one or more second validation sequence check operations. The determined probe point data object and/or validated probe point data object may be used to determine one or more traffic conditions, and as a result, traffic condition determinations may be determined more accurately and efficiently.

20 Claims, 12 Drawing Sheets

(56) References Cited

U.S. PATENT DOCUMENTS

| | | | | |
|---|---|---|---|---|
| 8,284,995 | B2 | 10/2012 | Diaz et al. | |
| 10,397,089 | B2 * | 8/2019 | Dorum | G08G 1/0133 |
| 10,515,542 | B2 | 12/2019 | Littlejohn | |
| 10,838,954 | B1 * | 11/2020 | Santos | G10L 15/22 |
| 10,983,877 | B1 * | 4/2021 | Hoffman | G06F 11/3034 |
| 10,996,061 | B2 | 5/2021 | Stajner et al. | |
| 12,174,032 | B2 * | 12/2024 | Fowe | G01C 21/3492 |
| 12,184,528 | B2 * | 12/2024 | Chowdhury | H04L 43/04 |
| 2011/0072002 | A1 | 3/2011 | Kirkby et al. | |
| 2011/0112760 | A1 * | 5/2011 | Serbanescu | G09B 29/106 |
| | | | | 701/465 |
| 2011/0137907 | A1 * | 6/2011 | Ikenoue | G06F 16/29 |
| | | | | 707/E17.089 |
| 2012/0004845 | A1 | 1/2012 | Kmiecik et al. | |
| 2014/0005940 | A1 * | 1/2014 | Suzuki | G01C 21/3484 |
| | | | | 701/527 |
| 2014/0372022 | A1 | 12/2014 | Witmer | |
| 2015/0006069 | A1 | 1/2015 | Kwon et al. | |
| 2015/0018011 | A1 * | 1/2015 | Mendelson | G01S 5/0226 |
| | | | | 455/456.3 |
| 2015/0160020 | A1 * | 6/2015 | van Hemert | A61B 5/18 |
| | | | | 701/532 |
| 2015/0300837 | A1 * | 10/2015 | Hisano | G08G 1/096811 |
| | | | | 701/454 |
| 2016/0021093 | A1 | 1/2016 | Vinckier | |
| 2016/0148429 | A1 * | 5/2016 | Groppa | G09G 5/026 |
| | | | | 345/419 |
| 2016/0284212 | A1 | 9/2016 | Tatourian et al. | |
| 2016/0379485 | A1 * | 12/2016 | Anastassov | G08G 1/0129 |
| | | | | 701/117 |
| 2017/0314934 | A1 * | 11/2017 | Averbuch | G01S 19/50 |
| 2018/0066957 | A1 * | 3/2018 | Stroila | G01C 21/3841 |
| 2018/0121483 | A1 | 5/2018 | Giurgiu et al. | |
| 2018/0143998 | A1 * | 5/2018 | Prahladka | G01C 21/3682 |
| 2018/0158369 | A1 * | 6/2018 | Al Darwesh | G09B 21/007 |
| 2018/0173222 | A1 * | 6/2018 | Tseng | G01C 21/3691 |
| 2018/0276988 | A1 | 9/2018 | Littlejohn | |
| 2018/0299272 | A1 * | 10/2018 | Salowitz | H04W 4/021 |
| 2019/0170530 | A1 * | 6/2019 | Martyniv | G08G 1/096838 |
| 2019/0235251 | A1 * | 8/2019 | Amano | G08G 1/202 |
| 2019/0310100 | A1 | 10/2019 | Yang | |
| 2019/0313210 | A1 * | 10/2019 | Ohkawa | G06F 16/29 |
| 2020/0326201 | A1 * | 10/2020 | Nara | G06F 3/147 |
| 2021/0020034 | A1 * | 1/2021 | Lorenz | G08G 1/0141 |
| 2021/0082285 | A1 * | 3/2021 | Bieger | B62D 15/027 |
| 2021/0095971 | A1 | 4/2021 | Mao et al. | |
| 2021/0180985 | A1 | 6/2021 | Yokota et al. | |
| 2021/0370933 | A1 * | 12/2021 | Zhang | B60W 30/0956 |
| 2022/0057216 | A1 * | 2/2022 | Zhang | G01C 21/30 |
| 2022/0078171 | A1 * | 3/2022 | Borak | H04L 63/0236 |
| 2022/0130054 | A1 * | 4/2022 | Okano | G06T 7/246 |
| 2022/0180099 | A1 * | 6/2022 | Yadav | G06V 20/176 |
| 2022/0182412 | A1 * | 6/2022 | Borak | H04L 63/20 |
| 2022/0246028 | A1 * | 8/2022 | White | G08G 1/0125 |
| 2022/0290995 | A1 * | 9/2022 | Zhang | G01C 21/3697 |
| 2022/0358400 | A1 * | 11/2022 | Zheng | G06N 20/00 |
| 2022/0417718 | A1 * | 12/2022 | Yoshida | B60R 16/023 |
| 2023/0204381 | A1 | 6/2023 | Nutakki et al. | |
| 2023/0221136 | A1 * | 7/2023 | Rodrigues | G01C 21/3852 |
| | | | | 701/450 |
| 2023/0229457 | A1 * | 7/2023 | Chivukula | G06F 9/4881 |
| | | | | 718/102 |
| 2023/0304819 | A1 * | 9/2023 | Nishijima | G01C 21/362 |

OTHER PUBLICATIONS

Non-Final Office Action for U.S. Appl. No. 18/147,538 dated Jan. 14, 2025.
Final Office Action for U.S. Appl. No. 18/147,538 dated Aug. 4, 2025.

* cited by examiner

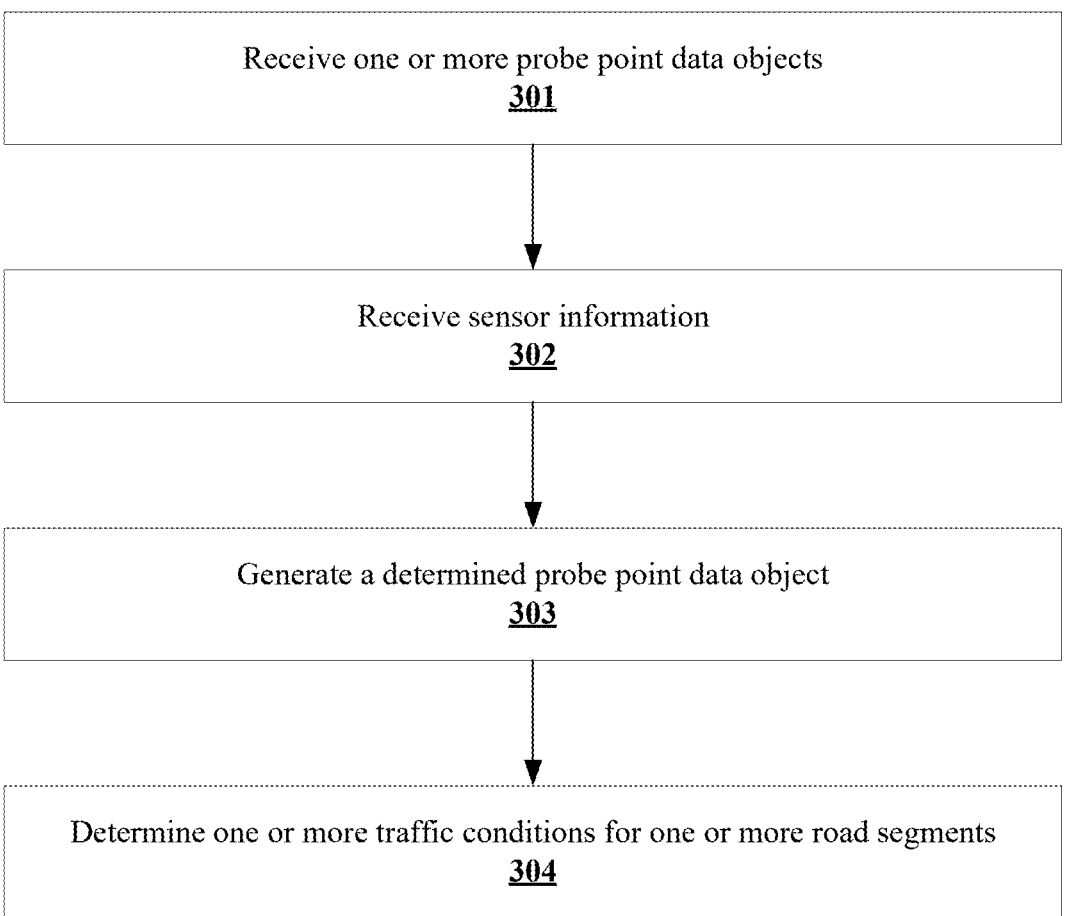
Receive one or more probe point data objects
301
Receive sensor information
302
Generate a determined probe point data object
303
Determine one or more traffic conditions for one or more road segments
304
Figure 3

400

Identify a determined probe point data object
401

Map each probe point data object to a geospatial grid point on a geospatial reference table
402

Determine an anomalous probe point set
403

Update the determined probe point data object to exclude the one or more probe point data objects which belong to the anomalous probe point set
404

Determine one or more traffic conditions for one or more road segments based at least in part on the determined probe point data object
405

Figure 4

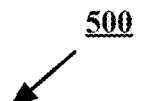
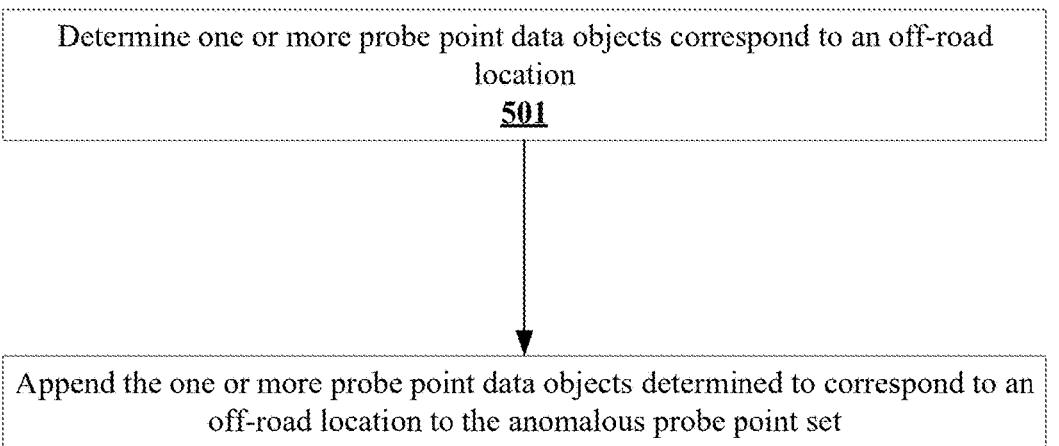
Determine one or more probe point data objects correspond to an off-road location
501
Append the one or more probe point data objects determined to correspond to an off-road location to the anomalous probe point set
502
Figure 5

800a

| PROBE_ID | DATE | LAT | LON | HEADING |
|---|---|---|---|---|
| UVID_A | 2015-04-20 00:26:20 | 42.634512 | -76.392196 | 10 |
| UVID_A | 2015-04-20 00:26:20 | 42.634506 | -76.392197 | 10 |
| UVID_A | 2015-04-20 00:26:20 | 42.634532 | -76.392315 | 296 |
| UVID_A | 2015-04-20 00:26:20 | 42.634517 | -76.392308 | 290 |
| UVID_A | 2015-04-20 00:26:20 | 42.634489 | -76.392235 | 280 |
| UVID_A | 2015-04-20 00:26:20 | 42.634485 | -76.392238 | 275 |
| UVID_A | 2015-04-20 00:26:20 | 42.634501 | -76.3922 | 10 |
| UVID_A | 2015-04-20 00:26:20 | 42.634478 | -76.392228 | 266 |

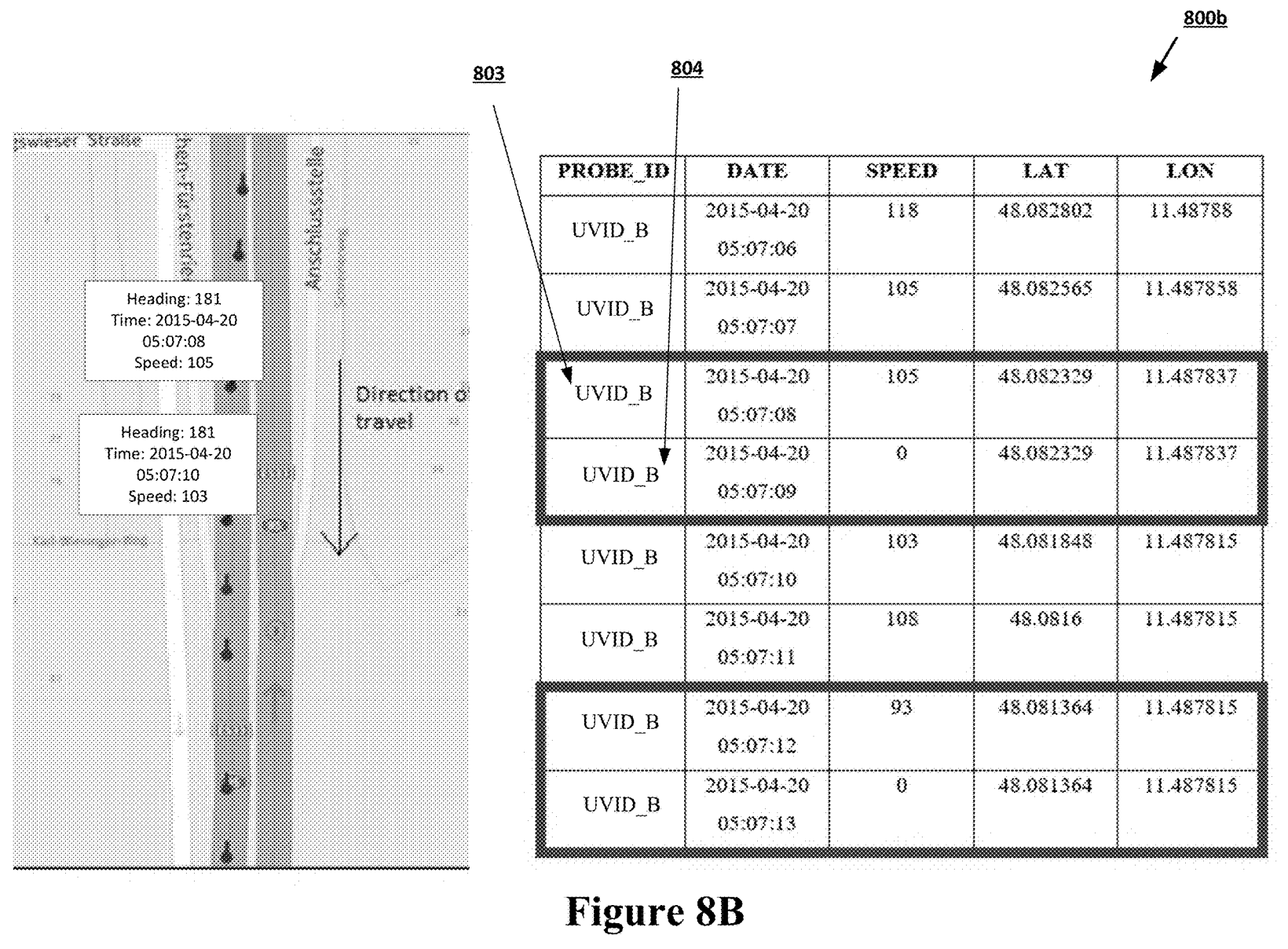

| PROBE_ID | DATE | SPEED | LAT | LON |
|----------|------|-------|-----|-----|
| UVID_B | 2015-04-20 05:07:06 | 118 | 48.082802 | 11.48788 |
| UVID_B | 2015-04-20 05:07:07 | 105 | 48.082565 | 11.487858 |
| UVID_B | 2015-04-20 05:07:08 | 105 | 48.082329 | 11.487837 |
| UVID_B | 2015-04-20 05:07:09 | 0 | 48.082329 | 11.487837 |
| UVID_B | 2015-04-20 05:07:10 | 103 | 48.081848 | 11.487815 |
| UVID_B | 2015-04-20 05:07:11 | 108 | 48.0816 | 11.487815 |
| UVID_B | 2015-04-20 05:07:12 | 93 | 48.081364 | 11.487815 |
| UVID_B | 2015-04-20 05:07:13 | 0 | 48.081364 | 11.487815 |

804

803

Direction of travel

Heading: 181
Time: 2015-04-20 05:07:08
Speed: 105

Heading: 181
Time: 2015-04-20 05:07:10
Speed: 103

Figure 8B

| PROBE_ID | DATE | SPEED | LAT | LON |
|---|---|---|---|---|
| UVID_C | 2015-04-20 20:59:01 | 0 | 41.90446 | -87.6248808 |
| UVID_C | 2015-04-20 20:59:02 | 0 | 41.904272 | -87.6247752 |
| UVID_C | 2015-04-20 20:59:03 | 0 | 41.903896 | -87.6246656 |
| UVID_C | 2015-04-20 20:59:04 | 0 | 41.903696 | -87.6246608 |
| UVID_C | 2015-04-20 20:59:05 | 0 | 41.903316 | -87.6245522 |
| UVID_C | 2015-04-20 20:59:06 | 0 | 41.902776 | -87.6244448 |
| UVID_C | 2015-04-20 20:59:07 | 0 | 41.9026 | -87.6243336 |
| UVID_C | 2015-04-20 20:59:08 | 0 | 41.902424 | -87.6243256 |

800c

806

805

| PROBE_ID | DATE | LAT | LON | SPEED | HEADING |
|---|---|---|---|---|---|
| UVID_D | 2015-04-20 20:59:01 | 41.69332 | -87.72336 | 0 | 269 |
| UVID_D | 2015-04-20 20:59:02 | 41.69332 | -87.72336 | 0 | 269 |
| UVID_D | 2015-04-20 20:59:03 | 41.69332 | -87.72336 | 0 | 269 |
| UVID_D | 2015-04-20 20:59:04 | 41.69332 | -87.72336 | 0 | 269 |
| UVID_D | 2015-04-20 20:59:05 | 41.69332 | -87.72336 | 0 | 269 |
| UVID_D | 2015-04-20 20:59:06 | 41.69332 | -87.72336 | 0 | 269 |
| UVID_D | 2015-04-20 20:59:07 | 41.69332 | -87.72336 | 0 | 269 |
| UVID_D | 2015-04-20 20:59:08 | 41.69332 | -87.72336 | 0 | 269 |

807

808

800d

METHOD AND APPARATUS FOR DEVICE PROBE POINT DATA OBJECT DETERMINATIONS AND VALIDATIONS

CROSS-REFERENCE TO RELATED APPLICATIONS

This application claims priority to Indian Application No. 202111061612, filed Dec. 29, 2021, the entire contents of which are incorporated herein by reference.

TECHNOLOGICAL FIELD

An example embodiment relates generally to a method, apparatus and computer program product for determining and validating probe point data objects and, more particularly, to a method, apparatus and computer program product for using the determined and/or validated probe point data objects for traffic condition determinations.

BACKGROUND

Vehicles and/or other devices may provide probe point data objects to a traffic system at periodic and/or semi-periodic intervals. Each probe point data object may provide a plurality of information regarding various device attributes. Such probe point data objects may be used by a traffic system to determine current traffic conditions and/or predict future conditions.

BRIEF SUMMARY

A method, apparatus and computer program product are provided in accordance with an example embodiment in order to determine probe point data objects for traffic condition determinations. In this regard, the method, apparatus and computer program product may determine a probe point data object which comprises one or more probe points. An anomalous probe point set may be determined, where the anomalous probe point set includes one or more probe points with sets of coordinates determined to be mapped to a geospatial grid point of a geospatial reference table not associated with a road segment. The probe point data object may then be updated to exclude the one or more probe point data objects which belong to the anomalous probe point set. The updated probe point data object may then be used to determine one or more traffic conditions for one or more road segments. As such, probe point data objects which may be associated with an insufficient probe point quality (e.g., probe point data objects which are not associated with a road segment) may be determined to belong to an anomalous probe point set and therefore, may be excluded from traffic condition determinations.

In an example embodiment, the method includes identifying a determined probe point data object for a device, wherein (i) the determined probe point data object comprises one or more probe point data objects, (ii) each probe point data object comprises at least a set of coordinates and a timestamp value, and (iii) each probe point data object is associated with sensor information captured at the corresponding timestamp associated with the probe point data object. The method may further include mapping each probe point data object of the determined probe point data object to a geospatial grid point of a geospatial reference table based at least in part on the set of coordinates associated each probe point data object. The method may further include determining an anomalous probe point set, wherein the anomalous probe set comprises one or more probe point data objects which include sets of coordinates mapped to geospatial grid points which are not associated with a road segment. The method may further include updating the determined probe point data object to exclude the one or more probe point data objects which belong to the anomalous probe point set. The method may further include determining one or more traffic conditions for one or more road segments based at least in part on the determined probe point data object.

In some embodiments, the method may further include generating a determined probe point data object based at least in part upon one or more received probe point data objects corresponding a unique device identifier and received sensor information corresponding to the unique device identifier, wherein sensor information captured at the timestamp corresponding to the probe point data object is associated with the particular probe point data object.

In some embodiments, the method may further include determining, using one or more image processing models, one or more probe point data objects correspond to an off-road location based at least in part on the sensor information for the one or more probe point data objects. In some embodiments, the method may further include appending the one or more probe point data objects which correspond to an off-road location to the anomalous probe point set.

In some embodiments, the geospatial reference table corresponds to a geographic area, the geospatial reference table comprises a plurality of geospatial grid points, and each geospatial grid point corresponds to a particular portion of the geographic area. In some embodiments, each geospatial grid point is associated with a grid category. In some embodiments, a grid category is at least one of an off-road segment category or a road segment category. In some embodiments, sensor information includes one or more image data objects.

In an example embodiment, an apparatus is configured with means for identifying a determined probe point data object for a device, wherein (i) the determined probe point data object comprises one or more probe point data objects, (ii) each probe point data object comprises at least a set of coordinates and a timestamp value, and (iii) each probe point data object is associated with sensor information captured at the corresponding timestamp associated with the probe point data object. The apparatus may further be configured with means for mapping each probe point data object of the determined probe point data object to a geospatial grid point of a geospatial reference table based at least in part on the set of coordinates associated each probe point data object. The apparatus may further be configured with means for determining an anomalous probe point set, wherein the anomalous probe set comprises one or more probe point data objects which include sets of coordinates mapped to geospatial grid points which are not associated with a road segment. The apparatus may further be configured with means for updating the determined probe point data object to exclude the one or more probe point data objects which belong to the anomalous probe point set. The apparatus may further be configured with means for determining one or more traffic conditions for one or more road segments based at least in part on the determined probe point data object.

In some embodiments, the apparatus may further be configured with means for generating a determined probe point data object based at least in part upon one or more received probe point data objects corresponding a unique device identifier and received sensor information corresponding to the unique device identifier, wherein sensor information captured at the timestamp corresponding to the probe point data object is associated with the particular probe point data object.

In some embodiments, the apparatus may further be configured with means for determining, using one or more image processing models, one or more probe point data objects correspond to an off-road location based at least in part on the sensor information for the one or more probe point data objects. In some embodiments, the apparatus may further be configured with means for appending the one or more probe point data objects which correspond to an off-road location to the anomalous probe point set.

In some embodiments, the geospatial reference table corresponds to a geographic area, the geospatial reference table comprises a plurality of geospatial grid points, and each geospatial grid point corresponds to a particular portion of the geographic area. In some embodiments, each geospatial grid point is associated with a grid category. In some embodiments, a grid category is at least one of an off-road segment category or a road segment category. In some embodiments, sensor information includes one or more image data objects.

In an example embodiment, an apparatus is disclosed, the apparatus comprising processor circuitry and at least one memory including computer program code, the at least one memory and the computer program code configured to, with the processing circuitry, cause the apparatus at least to identify a determined probe point data object for a device, wherein (i) the determined probe point data object comprises one or more probe point data objects, (ii) each probe point data object comprises at least a set of coordinates and a timestamp value, and (iii) each probe point data object is associated with sensor information captured at the corresponding timestamp associated with the probe point data object. The at least one memory and the computer program code may further be configured to, with the processing circuitry, cause the apparatus at least to map each probe point data object of the determined probe point data object to a geospatial grid point of a geospatial reference table based at least in part on the set of coordinates associated each probe point data object. The at least one memory and the computer program code may further be configured to, with the processing circuitry, cause the apparatus at least to determine an anomalous probe point set, wherein the anomalous probe point set comprises one or more probe point data objects which include sets of coordinates mapped to geospatial grid points which are not associated with a road segment. The at least one memory and the computer program code may further be configured to, with the processing circuitry, cause the apparatus at least to update the determined probe point data object to exclude the one or more probe point data objects which belong to the anomalous probe point set. The at least one memory and the computer program code may further be configured to, with the processing circuitry, cause the apparatus at least to determine one or more traffic conditions for one or more road segments based at least in part on the determined probe point data object.

In some embodiments, the at least one memory and the computer program code may further be configured to, with the processing circuitry, cause the apparatus at least to generate a determined probe point data object based at least in part upon one or more received probe point data objects corresponding to a unique device identifier and received sensor information corresponding to the unique device identifier, wherein sensor information captured at the timestamp corresponding to the probe point data object is associated with the particular probe point data object.

In some embodiments, at least one memory and the computer program code may further be configured to, with the processing circuitry, cause the apparatus at least to determine, using one or more image processing models, one or more probe point data objects corresponding to an off-road location based at least in part on the sensor information for the one or more probe point data objects. In some embodiments, the at least one memory and the computer program code may further be configured to, with the processing circuitry, cause the apparatus at least to append the one or more probe point data objects which correspond to an off-road location to the anomalous probe point set.

In some embodiments, the geospatial reference table corresponds to a geographic area, the geospatial reference table comprises a plurality of geospatial grid points, and each geospatial grid point corresponds to a particular portion of the geographic area. In some embodiments, each geospatial grid point is associated with a grid category. In some embodiments, a grid category is at least one of an off-road segment category or a road segment category. In some embodiments, wherein sensor information includes one or more image data objects.

In an example embodiment, a computer program product is disclosed, the computer program product comprising at least one non-transitory computer-readable storage medium having computer-executable program code portions stored therein, the computer-executable program code portions comprising program code instructions configured to identify a determined probe point data object for a device, wherein (i) the determined probe point data object comprises one or more probe point data objects, (ii) each probe point data object comprises at least a set of coordinates and a timestamp value, and (iii) each probe point data object is associated with sensor information captured at the corresponding timestamp associated with the probe point data object. The computer-executable program code portions comprising program code instructions further configured to map each probe point data object of the determined probe point data object to a geospatial grid point of a geospatial reference table based at least in part on the set of coordinates associated with each probe point data object. The computer-executable program code portions comprising program code instructions may further be configured to determine an anomalous probe point set, wherein the anomalous probe point set comprises one or more probe point data objects which includes sets of coordinates mapped to geospatial grid points which are not associated with a road segment. The computer-executable program code portions comprising program code instructions may further be configured to update the determined probe point data object to exclude the one or more probe point data objects which belong to the anomalous probe point set. The computer-executable program code portions comprising program code instructions may further be configured to determine one or more traffic conditions for one or more road segments based at least in part on the determined probe point data object.

In some embodiments, computer-executable program code portions comprising program code instructions may further be configured to generate a determined probe point data object based at least in part upon one or more received probe point data objects corresponding to a unique device identifier and received sensor information corresponding to the unique device identifier, wherein sensor information captured at the timestamp corresponding to the probe point data object is associated with the particular probe point data object.

In some embodiments, computer-executable program code portions comprising program code instructions may further be configured to determine, using one or more image processing models, if one or more probe point data objects correspond to an off-road location based at least in part on the sensor information for the one or more probe point data objects. In some embodiments, computer-executable program code portions comprising program code instructions may further be configured to append the one or more probe point data objects which correspond to an off-road location to the anomalous probe point set.

In some embodiments, the geospatial reference table corresponds to a geographic area, the geospatial reference table comprises a plurality of geospatial grid points, and each geospatial grid point corresponds to a particular portion of the geographic area. In some embodiments, each geospatial grid point is associated with a grid category. In some embodiments, a grid category is at least one of an off-road segment category or a road segment category. In some embodiments, wherein sensor information includes one or more image data objects.

Additionally or alternatively, in some embodiments, the method, apparatus and computer program product may validate probe data points and generate a validated probe point data set, which may then be used to determine one or more traffic conditions for one or more road segments. In this regard, two or more sequential probe point data objects may be identified, and validated using one or more first validation sequence check operations and one or more second validation sequence check operations. A validated probe point set data object may then be generated and may include probe point data objects which are validated by both the one or more first validation sequence check operations and the one or more second validation sequence check operations. As such, probe point data objects which may be associated with an insufficient probe point quality (e.g., probe points which are not validated using either the first sequence check operations and/or second sequence check operations) may not be included in a validated probe point data object set and therefore, may be excluded from traffic condition determinations.

In an example embodiment, the method includes identifying two or more sequential probe point data objects corresponding to a unique identifier. The method may further include validating the two or more sequential probe point data objects using one or more first validation sequence check operations. The method may further include, in an instance when the two or more sequential probe point data objects are validated using one or more first validation sequence check operations, validating the two or more sequential probe point data objects using one or more second validation sequence check operations. The method may further include generating a validated probe point set data object comprising the two or more sequential probe point data objects in an instance where the two or more sequential probe point data objects are validated by the one or more first validation sequence check operations and then the one or more second validation sequence check operations. The method may further include determining one or more traffic conditions for one or more road segments based at least in part on the validated probe point set data object.

In some embodiments, the two or more sequential probe point data objects are not validated by the one or more first validation sequence check operations in an instance where the two or more sequential probe point data objects comprise the same timestamp.

In some embodiments, the two or more sequential probe point data objects are not validated by the first validation sequence check operation in an instance where the two or more sequential probe point data objects comprise the same set of coordinates.

In some embodiments, the two or more sequential probe point data objects are not validated by the first validation sequence check operation in an instance where the two or more sequential probe point data objects comprise zero value speeds.

In some embodiments, the method further includes determining an absolute device speed difference for each of the two or more sequential probe point data objects based at least in part on corresponding device speeds for the two or more sequential probe point data objects. In some embodiments, the two or more sequential probe point data objects are not validated by the second validation sequence check operation in an instance where the absolute device speed difference fails to satisfy one or more device speed difference threshold values.

In some embodiments, the method further includes determining an estimated device speed based at least in part on the set of coordinates for the two or more sequential probe point data objects. In some embodiments, the method further includes determining an estimated device speed difference based at least in part on the absolute device speed and the estimated device speed. In some embodiments, the two or more sequential probe point data objects are not validated by the second validation sequence check operation in an instance where the estimated device speed difference fails to satisfy one or more estimated device speed difference threshold values.

In some embodiments, each probe point data object comprises one or more of a unique device identifier, a timestamp at which the probe point data object was generated by the device, a set of coordinates, a device speed, and/or a device heading value.

In an example embodiment, an apparatus is configured with means for identifying two or more sequential probe point data objects corresponding to a unique identifier. The apparatus may further be configured with means for validating the two or more sequential probe point data objects using one or more first validation sequence check operations. The apparatus may further be configured with means for, in an instance the two or more sequential probe point data objects are validated using one or more first validation sequence check operations, validating the two or more sequential probe point data objects using one or more second validation sequence check operations. The apparatus may further be configured with means for generating a validated probe point set data object comprising the two or more sequential probe point data objects in an instance where the two or more sequential probe point data objects are validated by the one or more first validation sequence check operations and the one or more second validation sequence check operations. The apparatus may further be configured with means for determining one or more traffic conditions for one or more road segments based at least in part on the validated probe point set data object.

In some embodiments, the two or more sequential probe point data objects are not validated by the one or more first validation sequence check operations in an instance where the two or more sequential probe point data objects comprise the same timestamp.

In some embodiments, the two or more sequential probe point data objects are not validated by the first validation sequence check operation in an instance where the two or more sequential probe point data objects comprise the same set of coordinates.

In some embodiments, the two or more sequential probe point data objects are not validated by the first validation sequence check operation in an instance where the two or more sequential probe point data objects comprise zero value speeds.

In some embodiments, the apparatus may further be configured with means for determining an absolute device speed difference for each of the two or more sequential probe point data objects based at least in part on corresponding device speeds for the two or more sequential probe point data objects. In some embodiments, the two or more sequential probe point data objects are not validated by the second validation sequence check operation in an instance where the absolute device speed difference fails to satisfy one or more device speed difference threshold values.

In some embodiments, the apparatus may further be configured with means for determining an estimated device speed based at least in part on the set of coordinates for the two or more sequential probe point data objects. In some embodiments, the apparatus may further be configured with means for determining an estimated device speed difference based at least in part on the absolute device speed and the estimated device speed. In some embodiments, the two or more sequential probe point data objects are not validated by the second validation sequence check operation in an instance where the estimated device speed difference fails to satisfy one or more estimated device speed difference threshold values.

In some embodiments, each probe point data object comprises one or more of a unique device identifier, a timestamp at which the probe point data object was generated by the device, a set of coordinates, a device speed, and/or a device heading value.

In an example embodiment, an apparatus is disclosed, the apparatus comprising processor circuitry and at least one memory including computer program code, the at least one memory and the computer program code configured to, with the processing circuitry, cause the apparatus at least to identify two or more sequential probe point data objects corresponding to a unique identifier. The at least one memory and the computer program code may further be configured to, with the processing circuitry, cause the apparatus at least to validate the two or more sequential probe point data objects using one or more first validation sequence check operations. The at least one memory and the computer program code may further be configured to, with the processing circuitry, cause the apparatus at least to, in an instance the two or more sequential probe point data objects are validated using one or more first validation sequence check operations, validate the two or more sequential probe point data objects using one or more second validation sequence check operations. The at least one memory and the computer program code may further be configured to, with the processing circuitry, cause the apparatus at least to generate a validated probe point set data object comprising the two or more sequential probe point data objects in an instance where the two or more sequential probe point data objects are validated by the one or more first validation sequence check operations and the one or more second validation sequence check operations. The at least one memory and the computer program code may further be configured to, with the processing circuitry, cause the apparatus at least to determine one or more traffic conditions for one or more road segments based at least in part on the validated probe point set data object.

In some embodiments, the two or more sequential probe point data objects are not validated by the one or more first validation sequence check operations in an instance where the two or more sequential probe point data objects comprise the same timestamp.

In some embodiments, the two or more sequential probe point data objects are not validated by the first validation sequence check operation in an instance where the two or more sequential probe point data objects comprise the same set of coordinates.

In some embodiments, the two or more sequential probe point data objects are not validated by the first validation sequence check operation in an instance where the two or more sequential probe point data objects comprise zero value speeds.

In some embodiments, the at least one memory and the computer program code may further be configured to, with the processing circuitry, cause the apparatus at least to determine an absolute device speed difference for each of the two or more sequential probe point data objects based at least in part on corresponding device speeds for the two or more sequential probe point data objects. In some embodiments, the two or more sequential probe point data objects are not validated by the second validation sequence check operation in an instance where the absolute device speed difference fails to satisfy one or more device speed difference threshold values.

In some embodiments, the at least one memory and the computer program code may further be configured to, with the processing circuitry, cause the apparatus at least to determine an estimated device speed based at least in part on the set of coordinates for the two or more sequential probe point data objects. In some embodiments, the at least one memory and the computer program code may further be configured to, with the processing circuitry, cause the apparatus at least to determine an estimated device speed difference based at least in part on the absolute device speed and the estimated device speed. In some embodiments, the two or more sequential probe point data objects are not validated by the second validation sequence check operation in an instance where the estimated device speed difference fails to satisfy one or more estimated device speed difference threshold values.

In some embodiments, each probe point data object comprises one or more of a unique device identifier, a timestamp at which the probe point data object was generated by the device, a set of coordinates, a device speed, and/or a device heading value.

In an example embodiment, a computer program product is disclosed, the computer program product comprising at least one non-transitory computer-readable storage medium having computer-executable program code portions stored therein, the computer-executable program code portions comprising program code instructions configured to identify two or more sequential probe point data objects corresponding to a unique identifier. The computer-executable program code portions comprising program code instructions may further be configured to validate the two or more sequential probe point data objects using one or more first validation sequence check operations. The computer-executable program code portions comprising program code instructions may further be configured to, in an instance the two or more sequential probe point data objects are validated using one or more first validation sequence check operations, validate the two or more sequential probe point data objects using one or more second validation sequence check operations. The computer-executable program code portions comprising program code instructions may further be configured to generate a validated probe point set data object comprising the two or more sequential probe point data objects in an instance where the two or more sequential probe point data objects are validated by the one or more first validation sequence check operations and the one or more second validation sequence check operations. The computer-executable program code portions comprising program code instructions may further be configured to determine one or more traffic conditions for one or more road segments based at least in part on the validated probe point set data object.

In some embodiments, the two or more sequential probe point data objects are not validated by the one or more first validation sequence check operations in an instance where the two or more sequential probe point data objects comprise the same timestamp.

In some embodiments, the two or more sequential probe point data objects are not validated by the first validation sequence check operation in an instance where the two or more sequential probe point data objects comprise the same set of coordinates.

In some embodiments, the two or more sequential probe point data objects are not validated by the first validation sequence check operation in an instance where the two or more sequential probe point data objects comprise zero value speeds.

In some embodiments, the computer-executable program code portions comprising program code instructions may further be configured to determine an absolute device speed difference for each of the two or more sequential probe point data objects based at least in part on corresponding device speeds for the two or more sequential probe point data objects. In some embodiments, the two or more sequential probe point data objects are not validated by the second validation sequence check operation in an instance where the absolute device speed difference fails to satisfy one or more device speed difference threshold values.

In some embodiments, the computer-executable program code portions comprising program code instructions may further be configured to determine an estimated device speed based at least in part on the set of coordinates for the two or more sequential probe point data objects. In some embodiments, the computer-executable program code portions comprising program code instructions may further be configured to determine an estimated device speed difference based at least in part on the absolute device speed and the estimated device speed. In some embodiments, the two or more sequential probe point data objects are not validated by the second validation sequence check operation in an instance where the estimated device speed difference fails to satisfy one or more estimated device speed difference threshold values.

In some embodiments, each probe point data object comprises one or more of a unique device identifier, a timestamp at which the probe point data object was generated by the device, a set of coordinates, a device speed, and/or a device heading value.

BRIEF DESCRIPTION OF THE DRAWINGS

Figure 1:
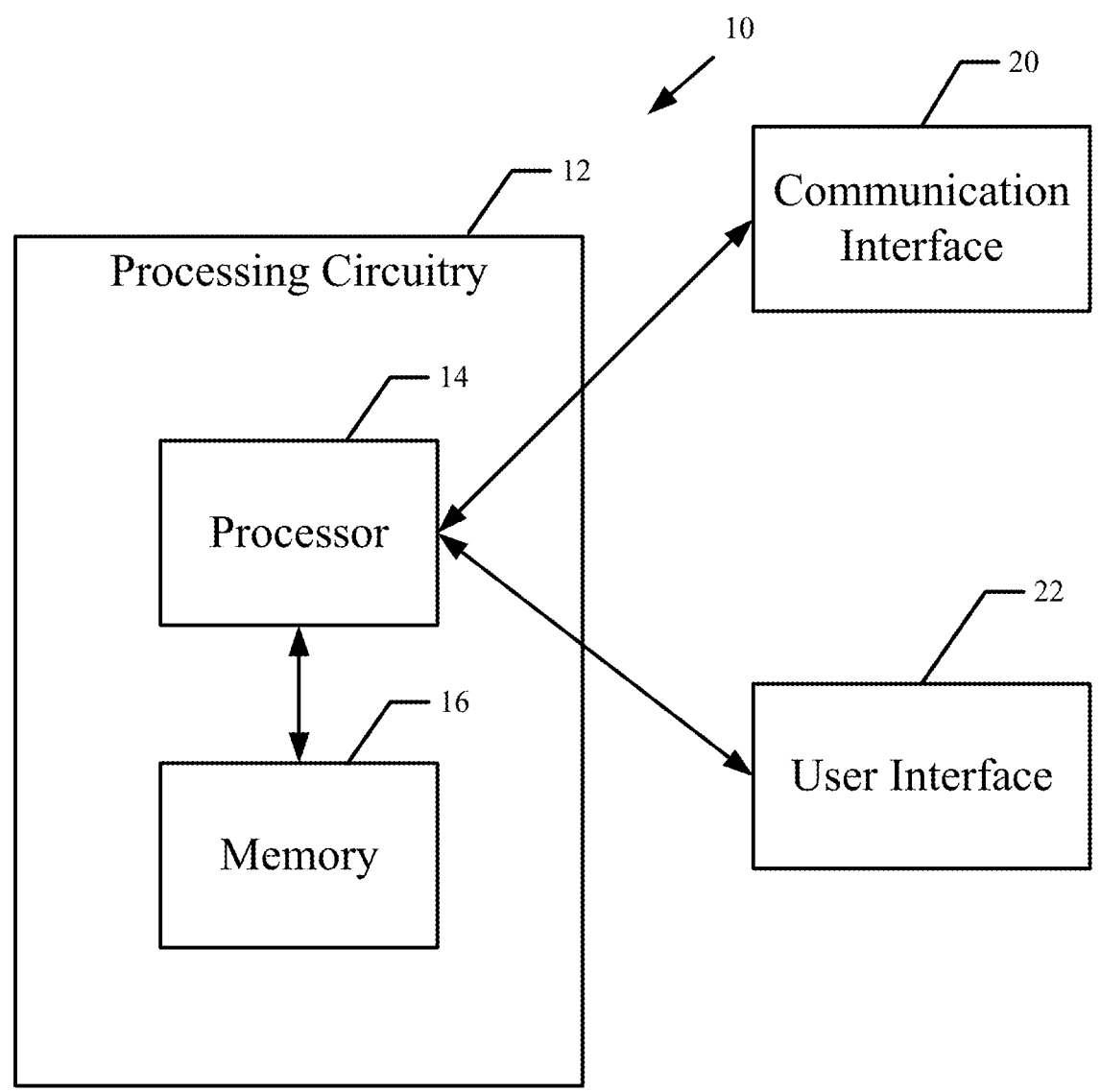
Figure 2:
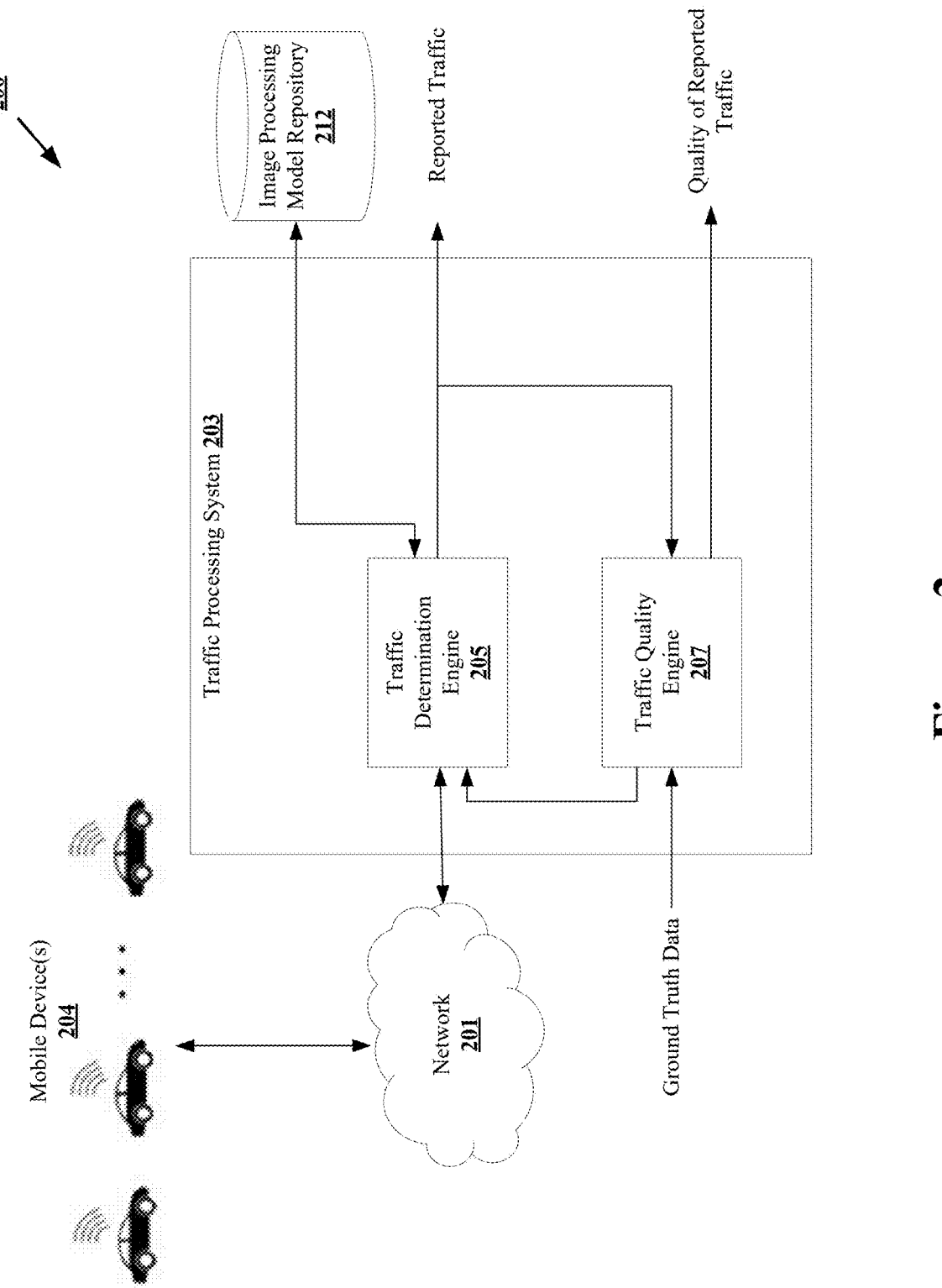
Figure 6:
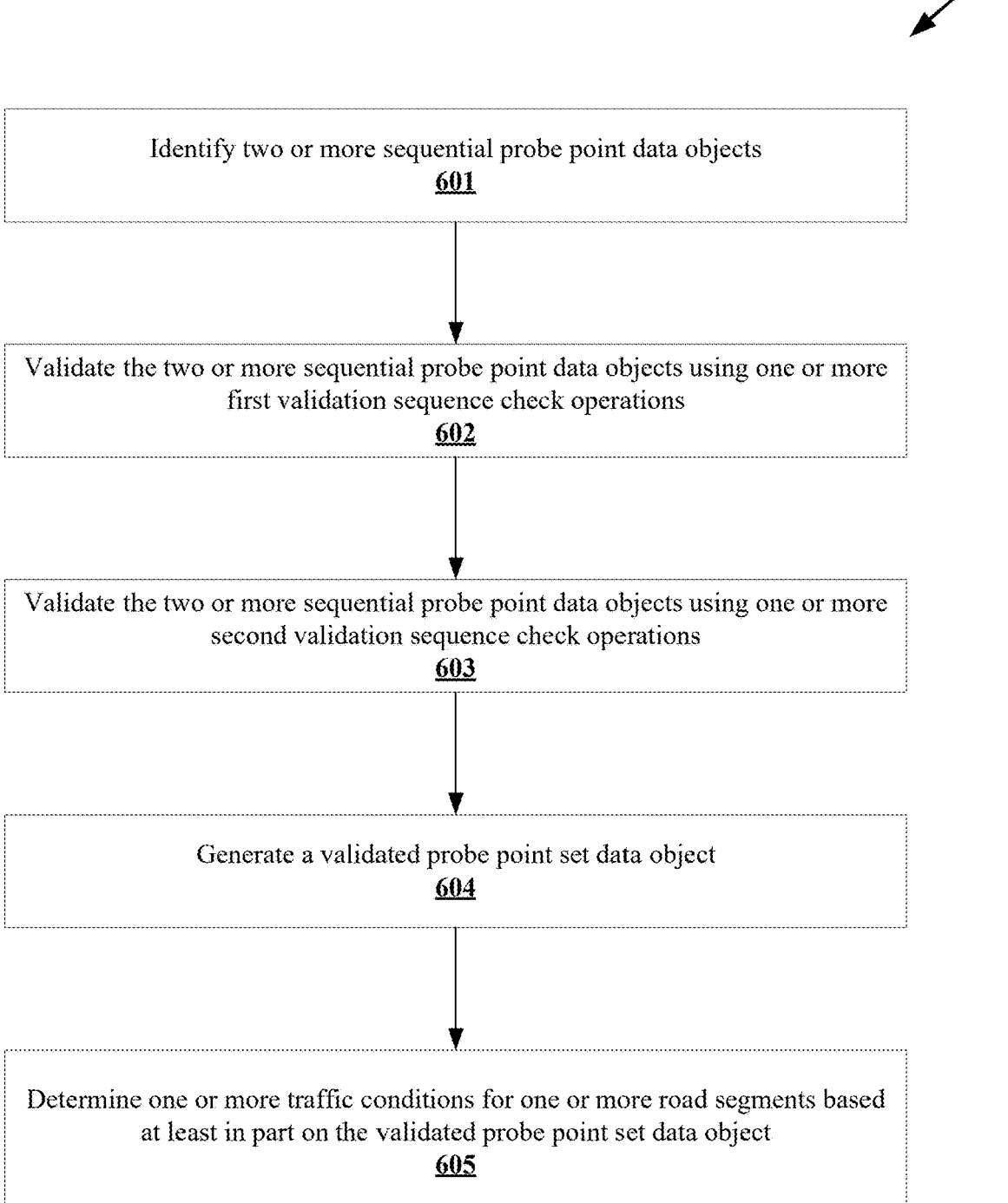
Figure 7:
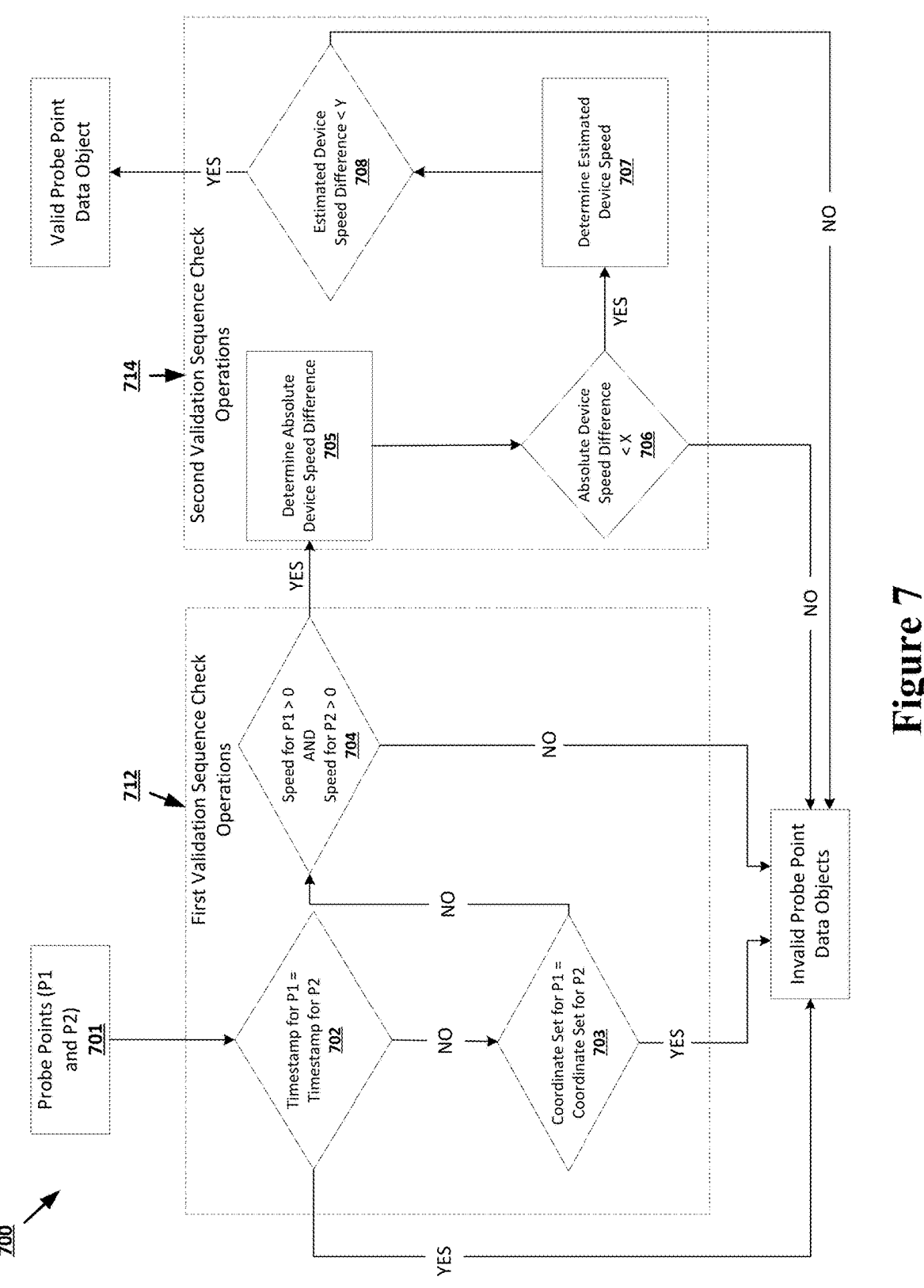
Figure 8C:
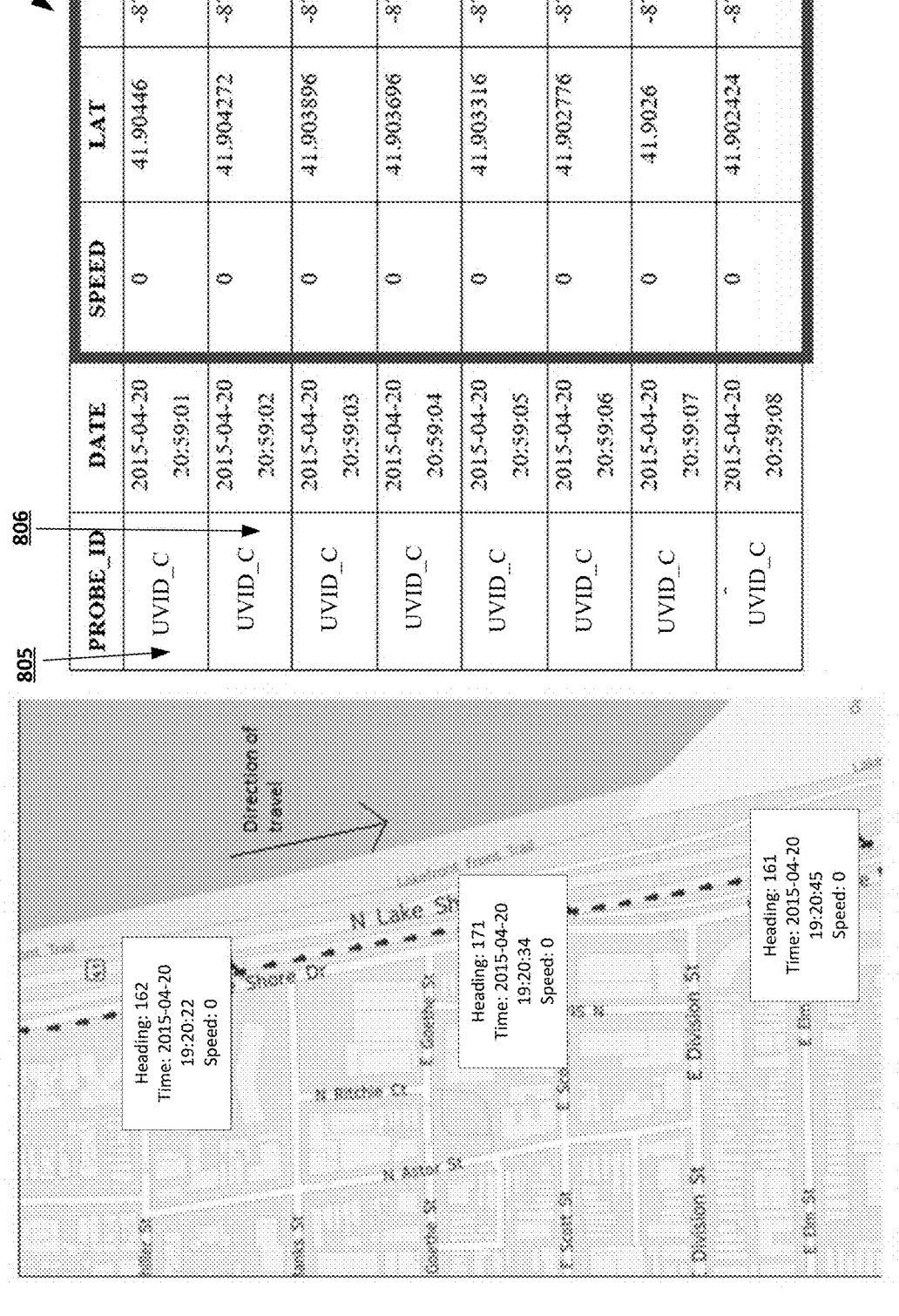
Figure 8D:
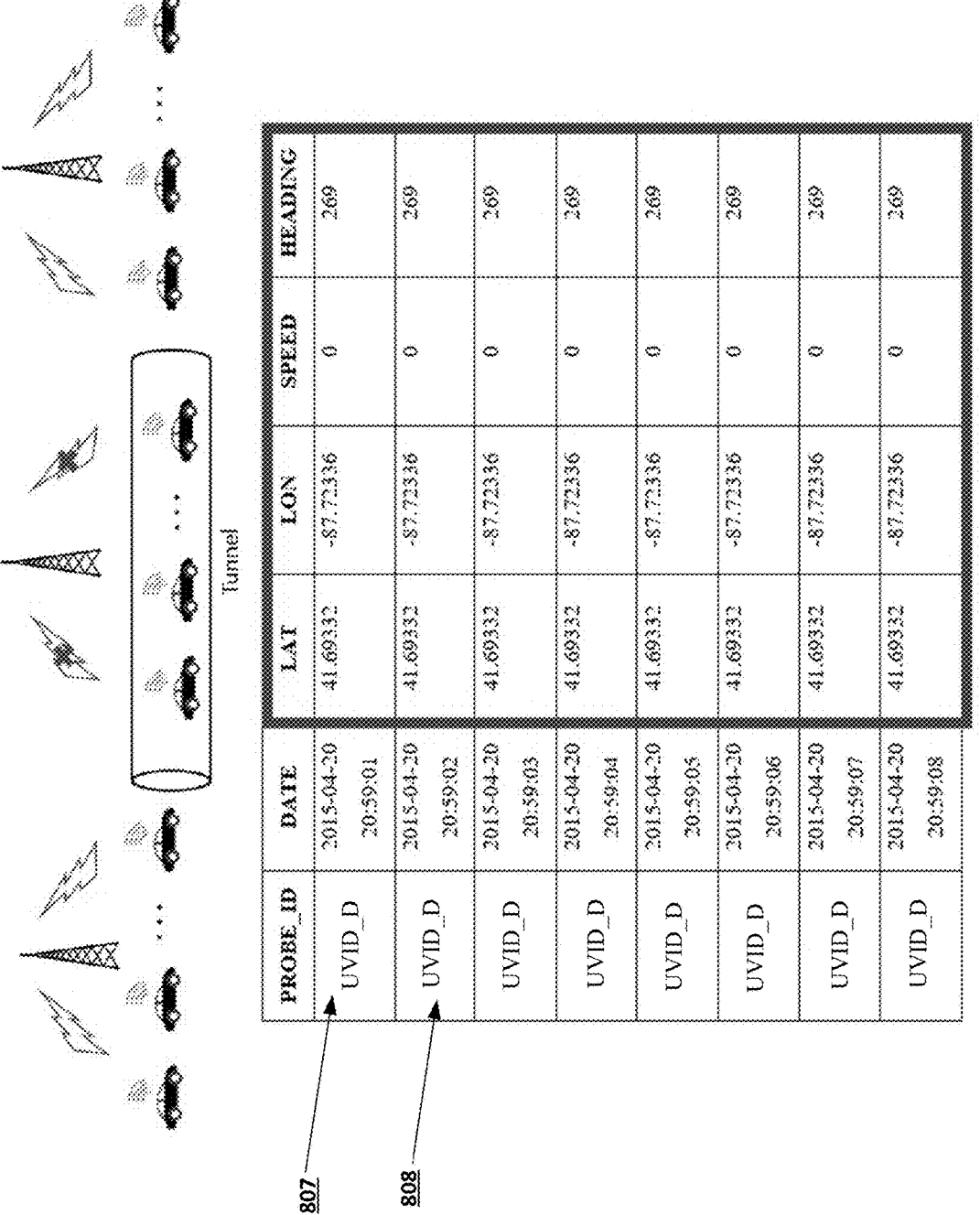
Figure 9B:
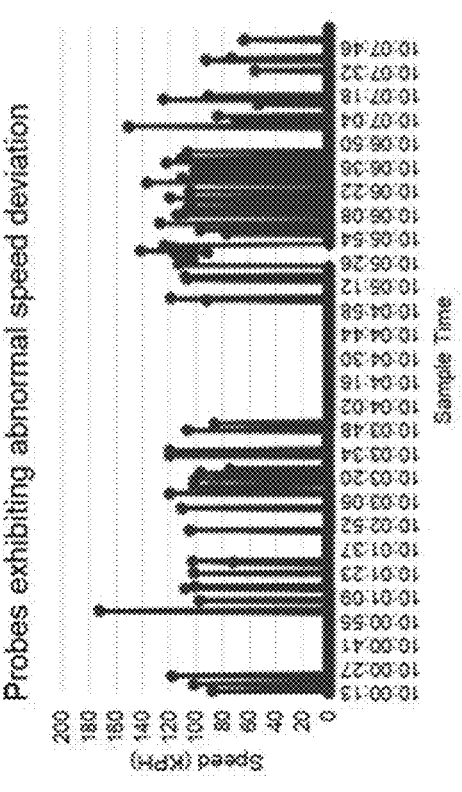
Figure 9A:
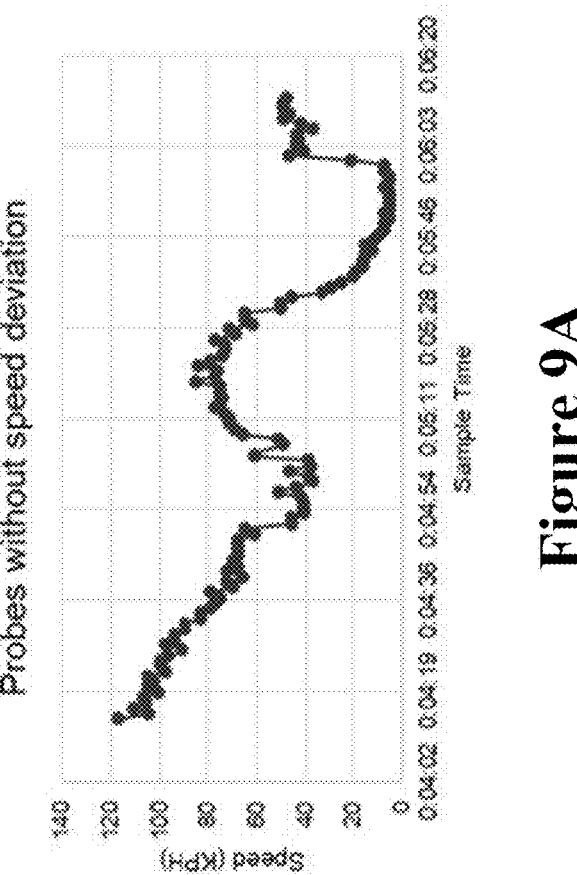

Having thus described certain embodiments of the invention in general terms, reference will now be made to the accompanying drawings, which are not necessarily drawn to scale, and wherein:

FIG. 1 is an apparatus that may be specifically configured in accordance with an example embodiment of the present disclosure in order to determine probe points and/or validate probe points in accordance with an example embodiment of the present disclosure;

FIG. 2 depicts a system that may be specifically configured in accordance with an example embodiment of the present disclosure to determine device probe point data objects and/or validate probe point data objects;

FIG. 3 is a flowchart illustrating the operations performed, such as by the apparatus of FIG. 2, in order to determine one or more traffic conditions for one or more road segments in accordance with an example embodiment of the present disclosure;

FIG. 4 is a flowchart illustrating the operations performed, such as by the apparatus of FIG. 2, for determining one or more traffic conditions using a determined probe point data objects which includes one or more device probe point data objects in accordance with an example embodiment of the present disclosure;

FIG. 5 is a flowchart illustrating the operations performed, such as by the apparatus of FIG. 2, for determining whether one or more device probe point data objects correspond to an off-road location in accordance with an example embodiment of the present disclosure;

FIG. 6 is a flowchart illustrating the operations performed, such as by the apparatus of FIG. 2, for determining one or more traffic conditions using a validated probe point set data object which includes one or more probe point data objects which have been validated in accordance with an example embodiment of the present disclosure;

FIG. 7 is a flowchart illustrating the operations performed, such as by the apparatus of FIG. 2, for performing one or more first validation sequence checks and one or more second validation sequence checks to validate one or more probe points in accordance with an example embodiment of the present disclosure;

FIGS. 8A-D illustrate example probe point data objects in accordance with an example embodiment of the present disclosure; and FIGS. 9A-B illustrate example speed graphs of probe point data objects in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As mentioned above, vehicles may provide probe point data objects to a traffic system at periodic and/or semi-periodic intervals, which can be used by the traffic system to determine current traffic conditions and/or predict future conditions. For example, using received vehicle probe point data objects, a traffic system may calculate and/or report traffic conditions such as vehicle speed, congestion level, lane level traffic, and/or the like for one or more road segments at a given time. However, the quality of received vehicle probe point data objects may vary, which thus may affect the accuracy of calculated and/or reported traffic conditions. The quality of probe points is dependent upon a variety of factors such that determination of probe point quality is non-trivial. For example, the quality of probe points may be affected by the accuracy of a set of location coordinates, speed measures, timestamp measures, and/or the like associated with the probe point. The inclusion of low quality probe points when determining traffic condition determinations may result in erroneous determined and/or reported traffic conditions, such as over-estimated and/or underestimated vehicle speeds, traffic condition pertaining to an inaccurate location, traffic condition pertaining to an inaccurate timeframe, etc. In order to maintain accuracy of traffic condition determinations, probe point data objects which are not of a sufficient quality should be eliminated from consideration so as to not to skew said traffic condition determinations.

Traditionally, a traffic system may employ a traffic quality engine which determines the quality of reported traffic based on ground-truth data. In instances where the reported traffic fails to satisfy one or more traffic quality values, a quality controller may adjust parameters of the traffic system to increase the traffic quality values. However, while such modification of the parameters of the traffic system engine may temporarily alleviate issues with reported traffic quality, the source of the issue may be with the probe point data and therefore such methods are inefficient and computationally expensive as they may require constant parameter readjustment.

As discussed herein, a method, apparatus and computer program product are provided which allow for the determination and/or validation of probe points to allow for traffic condition determinations using probe points of sufficient quality. In this regard, the method, apparatus and computer program product may determine a probe point data object which comprises one or more probe points. Each probe point data object may correspond to a set of coordinates and a timestamp value. Each probe point data object may then be mapped to a geospatial grid point of a geospatial reference table based on the set of coordinates associated with the particular probe point. An anomalous probe point set may then be determined where the anomalous probe point set includes one or more probe points with sets of coordinates mapped to a geospatial grid point not associated with a road segment. The probe point data object may then be updated to exclude the one or more probe point data objects which belong to the anomalous probe point set. The updated probe point data object may then be used to determine one or more traffic conditions for one or more road segments. As such, probe point data objects which may be associated with an insufficient probe point quality (e.g., probe point data objects which are not associated with a road segment) may be determined to belong to an anomalous probe point set and therefore, may be excluded from traffic condition determinations.

Furthermore, in some embodiments, each probe point of the probe point data object may be associated with sensor information. The sensor information for each of the one or more probe points may be processed using one or more image processing models to determine whether one or more probe points correspond to an off-road location based at least in part on the sensor information associated with the one or more probe points. In an instance where one or more probe points are determined to correspond to an off-road location, the one or more probe points are appended to the anomalous probe point set. As such, this allows for the exclusion of probe point data objects which may otherwise may not be excluded. For example, in an instance where a set of coordinates for a probe point is mapped to a geospatial reference table point which corresponds to a road segment but the sensor information associated with the probe point indicates the probe point corresponds to an off-road location, then the probe point may be appended to the anomalous probe point set and thereby excluded from traffic condition determinations. This may be advantageous in instances where the set of coordinates (e.g., global positioning system (GPS) coordinates) are inaccurate. For example, if a vehicle is not on a road segment and a probe point is taken at the timestamp the vehicle is not on the road segment, the probe point may be associated with GPS coordinates which are inaccurate and are mapped to a geospatial grid point corresponding to a road segment. However, by consideration of the sensor information associated with the probe point, the probe point may still be determined to be in an off-road location despite the inaccurate GPS coordinates indicating the vehicle is on the road segment.

Additionally or alternatively, in some embodiments, the method, apparatus and computer program product may validate probe data points and generate a validated probe point data set, which may then be used to determine one or more traffic conditions for one or more road segments. In this regard, two or more sequential probe point data objects may be identified, and validated using one or more first validation sequence check operations and one or more second validation sequence check operations. A validated probe point set data object may then be generated and may include probe point data objects which are validated by both the one or more first validation sequence check operations and the one or more second validation sequence check operations.

Advantageously determining probe points and/or validating probe points for use in traffic condition determinations allows for more accurate traffic condition determinations by excluding probe point data objects which are of insufficient quality. Additionally, the exclusion of probe points of insufficient quality allows for traffic condition determinations to be made in a more computationally effective and efficient manner by reducing the overall number of considered probe points.

FIG. 1 is a schematic diagram of an example apparatus 10 configured for performing any of the operations in accordance with an example embodiment as described herein. Apparatus 10 may be embodied by or associated with any of a variety of computing devices that include or are otherwise associated with a device configured for determining probe points and/or validating probe points. In other embodiments of the apparatus, the apparatus itself may be embodied or partially embodied as server or any other network computing device, a computing device onboard a vehicle, a navigation device, a mobile terminal, such as a personal digital assistant (PDA), mobile telephone, smart phone, personal navigation device, smart watch, tablet computer, camera or any combination of the aforementioned.

Optionally, the apparatus 10 may be embodied by or associated with a plurality of computing devices that are in communication with or otherwise networked with one another such that the various functions performed by the apparatus may be divided between the plurality of computing devices that operate in collaboration with one another.

The apparatus 10 may include, be associated with, or may otherwise be in communication with a processing circuitry 12, which includes a processor 14 and a memory device 16, a communication interface 20, and a user interface 22. In some embodiments, the processor 14 (and/or co-processors or any other processing circuitry assisting or otherwise associated with the processor) may be in communication with the memory device 16 via a bus for passing information among components of the apparatus. The memory device 16 may be non-transitory and may include, for example, one or more volatile and/or non-volatile memories. In other words, for example, the memory device 16 may be an electronic storage device (for example, a computer readable storage medium) comprising gates configured to store data (for example, bits) that may be retrievable by a machine (for example, a computing device like the processor). The memory device 16 may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 14 may be embodied in a number of different ways. For example, the processor 14 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor 14 may be configured to execute hard coded functionality. As such, whether configured by hardware or software methods, or by a combination thereof, the processor 14 may represent an entity (for example, physically embodied in circuitry) capable of performing operations according to an embodiment of the present disclosure while configured accordingly. Thus, for example, when the processor 14 is embodied as an ASIC, FPGA or the like, the processor may be specifically configured hardware for conducting the operations described herein. Alternatively, as another example, when the processor 14 is embodied as an executor of software instructions, the instructions may specifically configure the processor to perform the algorithms and/or operations described herein when the instructions are executed. However, in some cases, the processor 14 may be a processor of a specific device (for example, the computing device) configured to employ an embodiment of the present invention by further configuration of the processor by instructions for performing the algorithms and/or operations described herein. The processor 14 may include, among other things, a clock, an arithmetic logic unit (ALU) and logic gates configured to support operation of the processor.

The apparatus 10 of an example embodiment may also include or otherwise be in communication with a user interface 22. The user interface 22 may include a touch screen display, a speaker, physical buttons, and/or other input/output mechanisms. In an example embodiment, the processor 14 may comprise user interface circuitry configured to control at least some functions of one or more input/output mechanisms. The processor 14 and/or user interface 22 comprising the processor may be configured to control one or more functions of one or more input/output mechanisms through computer program instructions (for example, software and/or firmware) stored on a memory accessible to the processor (for example, memory device 16, and/or the like). The user interface 22 may be embodied in the same housing as the processing circuitry. Alternatively, the user interface 22 may be separate from the processing circuitry 12.

The apparatus 10 of an example embodiment may also optionally include a communication interface 20 that may be any means such as a device or circuitry embodied in either hardware or a combination of hardware and software that is configured to receive and/or transmit data from/to other electronic devices in communication with the apparatus, such as by near field communication (NFC) or other proximity-based techniques, such as Bluetooth. Additionally or alternatively, the communication interface 20 may be configured to communicate via cellular or other wireless protocols including Global System for Mobile Communications (GSM), such as but not limited to 4G, 5G, and Long Term Evolution (LTE). In this regard, the communication interface 20 may include, for example, an antenna (or multiple antennas) and supporting hardware and/or software for enabling communications with a wireless communication network. Additionally or alternatively, the communication interface 20 may include the circuitry for interacting with the antenna(s) to cause transmission of signals via the antenna(s) or to handle receipt of signals received via the antenna(s). In some environments, the communication interface 20 may alternatively or also support wired or wireless communications.

FIG. 2 illustrates a communication diagram of an example embodiment of a system for implementing example embodiments described herein. The illustrated embodiment of FIG. 2 includes a mobile device 204, which may be, for example, a mobile phone, an in-vehicle navigation system, an advanced driving assistance system (ADAS), or the like, which may be, for example, the apparatus 10 of FIG. 1 and a traffic processing system 203 which may be embodied by, for example, the apparatus 10 of FIG. 1. Each of the mobile devices 204 and traffic processing system 203 may be in communication with at least one of the other elements illustrated in FIG. 2 via a network, such a network 201. The network 201 may be any form of wireless or partially wireless network as will be described further below. Additional, different, or fewer components may be provided. For example, many mobile devices 204 may be in communication with the traffic processing system 203. As another example, a mobile device 204 may be in communication with one or more third-party entities (not shown) which may be in communication with the traffic processing system 203, such as via the network 201.

The traffic processing system 203 may include a traffic determination engine 205 and a traffic quality engine 207. The traffic determination engine 205 may be configured to determine one or more received probe points and/or validate one or more received probe points received from one or more mobile devices. In some embodiments, the traffic determination engine 205 may further be configured to provide one or more traffic determinations, such as one or more traffic condition determinations based at least in part on the one or more received probe points, to one or more external computing entities (not shown). The traffic quality engine 207 may be configured to determine an associated traffic quality score based at least in part on the one or more traffic determinations. In some embodiments, the traffic quality engine 207 may employ one or more machine learning models that are trained using ground truth data, such as from a traffic determination training corpus.

In some embodiments, the traffic processing system 203 may be configured to be communicatively connected to an image processing model repository 212. The image processing model repository 212 may be configured to store one or more image processing models, which may be accessed by the traffic determination engine 205. Additionally or alternatively, in some embodiments, an associated memory of the traffic processing system 203, such as memory device 16 may be configured to store the one or more processing models. The one or more stored image processing models may be used by the traffic determination engine 205 and/or traffic quality engine 207 in a variety of ways, such as to determine whether one or more probe points correspond to an off-road location. The one or more image processing models may be configured to process sensor information associated with each of the one or more probes using machine learning and/or artificial intelligence-based computer vision algorithms to detect real-world objects. For example, an image processing model may use one or more computer vision algorithms to determine whether a road segment is present, determine the proximity of the vehicle associated with the sensor information with respect to a road segment, detect the presence of one or more off-road attributes (e.g., trees, unpaved terrain, etc.). In some embodiments, the one or more image processing models may be convolution neural network (CNN) models trained to recognize one or more object, object classes, and/or the like.

Referring now to FIG. 3, the operations performed, such as by the apparatus 10 of FIG. 1, in accordance with an example embodiment in order to determine one or more traffic conditions for one or more road segments.

At block 301 of FIG. 3, the apparatus 10 embodied by a computing device, such as traffic determination engine 205 of the traffic processing system 203 includes means, such as the processing circuitry 12, communication interface 20, or the like, for receiving one or more probe point data objects. In some embodiments, the one or more probe point data objects may correspond to a vehicle. In some embodiments, the one or more probe point data objects may be received from one or more mobile devices associated with the vehicle. For example, the one or more mobile devices may include one or more on-board vehicle computers, one or more mobile phones, one or more cellular modems, and/or the like.

In some embodiments, each received probe point data object may include one or more of a probe point data object identifier which uniquely identifies the probe point data object from one or more other probe point data objects. In some embodiments, each probe point data object further includes a unique device identifier, such as a unique vehicle identifier (UVID) that uniquely identifies the device from which the probe point data object was generated. As such, probe point data objects generated from the same device may be determined based at least in part on the associated unique device identifier. Additionally, each probe point data object further includes one or more of a timestamp at which the probe point was generated, a set of coordinates (e.g., latitude and longitude, a relative coordinate system (using an x axis, y axis, and z axis), etc.) a device speed, and/or a device heading value.

At block 302 of FIG. 3, the apparatus 10 embodied by a computing device, such as traffic determination engine 205 of the traffic processing system 203 includes means, such as the processing circuitry 12, communication interface 20, or the like, for receiving sensor information. Similar to block 301, in some embodiments, the sensor may correspond to a unique device identifier, such as a UVID. In some embodiments, the sensor information may be received from one or more mobile devices associated with a vehicle. For example, the one or more mobile devices may include one or more on-board vehicle computers, one or more mobile phones, one or more cellular modems, and/or the like. In some embodiments, sensor information comprises one or more image data objects. The one or more image data objects may be captured by a device. For example, the one or more image data objects may be captured using one or more onboard vehicle sensors, such as one or more cameras. Further, the one or more image data objects may correspond to a particular timestamp value.

At block 303 of FIG. 3, the apparatus 10 embodied by a computing device, such as of the traffic processing system 203 includes means, such as the processing circuitry 12, or the like, for generating a determined probe point data object for a unique device identifier. In some embodiments, a determined probe point data object may be generated based at least in part on the one or more received probe point data object and received sensor information. The determined probe point data object may include one or more probe point data objects corresponding to the particular device identifier as well as sensor information corresponding to the same particular device identifier. Furthermore, the determined probe point data object may associate sensor information with one or more probe point data objects based at least in part on the respective timestamp values for the sensor information and the one or more probe point data objects. In some embodiments, the sensor information may be associated with one or more probe point data objects in an instance where the timestamp value associated with the sensor information satisfies a timestamp variability threshold. In some embodiments, the timestamp variability threshold is based at least in part on the frequency at which probe point data objects are received (e.g., every second, every thirty seconds, every minute, etc.) and/or the frequency at which sensor information is received (e.g., every second, every thirty seconds, every minute, etc.).

In some embodiments, a timestamp variability threshold may be associated with a value of zero such that only sensor information associated with a timestamp value that exactly matches one or more probe point data object timestamps is associated with the one or more probe point data objects. For example, sensor information captured at a timestamp of "2021-04-20 20:59:07" may only be associated with a probe point data object associated with a timestamp of "2021-04-20 20:59:07". In some embodiments, a timestamp variability threshold may be associated with a value of 30 seconds, such that sensor information associated with a timestamp value within 30 seconds (e.g., +/–30 seconds) of one or more probe point data object timestamps is associated with the one or more probe point data objects. For example, sensor information captured at a timestamp of "2021-04-20 20:59:

00" may be associated with a probe point data object associated with a timestamp of "2021-04-20 20:58:45" and a probe point data object associated with a timestamp of "2021-04-20 20:59:30".

At block 304 of FIG. 3, the apparatus 10 embodied by a computing device, such as traffic determination engine 205 includes means, such as the processing circuitry 12, or the like, for determining one or more traffic conditions for one or more road segments. In some embodiments, traffic condition determinations may include determinations pertaining to vehicle speed at a particular location for one or more road segments within a particular timeframe. In some embodiments, traffic condition determinations may include determinations pertaining to vehicle speed corresponding to a particular road segment lane for a road segment for a particular timeframe.

In some embodiments, the one or more traffic condition determinations may be used in a variety of ways. For example, the one or more traffic condition determinations may be used by computing entities during navigational route determinations, estimated time of arrival calculations, road segment event planning (e.g., road segment construction events, road segment rerouting navigational instructions, planned on-road events such as marathons, etc.) which consider current and/or predicted traffic conditions for various road segments.

In some embodiments, traffic condition determinations may be stored in an associated memory, such as memory device 16, and may be used for a variety of purposes, such as to predict one or more traffic conditions for one or more road segments at a future time. For example, the traffic determination engine 205 may be configured to employ one or more predictive traffic condition machine learning models to determine traffic conditions at a future time. The one or more predictive traffic condition machine learning models may be trained using historical traffic condition determinations, which may also be associated with ground truth data. As such, the parameters of the one or more predictive traffic condition machine learning models may be tuned based at least in part on historical traffic condition determinations to yield more accurate traffic condition determinations. Furthermore, in some embodiments, the traffic quality engine 207 may be configured to employ one or more predictive traffic quality machine learning models to determine the quality of traffic conditions reported by the traffic determination engine 205. The one or more predictive traffic quality machine learning models may be trained using historical traffic quality associated historical traffic condition determinations, which may also be associated with ground truth data. As such, the parameters of the one or more predictive traffic quality machine learning models may be tuned based at least in part on historical traffic quality determinations to yield more accurate traffic condition quality determinations.

In some embodiments, block 304 may be performed in accordance with the various steps/operations of the process 400 depicted in FIG. 4, which is a flowchart diagram of an example process for determining one or more traffic conditions for one or more road segments based at least in part on a determined probe point data object.

At block 401 of FIG. 4, the apparatus 10 embodied by a computing device, such as traffic determination engine 205 includes means, such as the processing circuitry 12, communication interface 20, or the like, for identifying a determined vehicle probe point data object. In some embodiments, the traffic determination engine 205 may identify the determined vehicle probe point data object after generation of the determined vehicle probe point data object as described with respect to block 303 of FIG. 3. The determined probe point data object may describe one or more probe point data objects and associated sensor information for a particular device identifier, such as a UVID. In some embodiments, the determined probe point data object may correspond to a particular time frame, a completed vehicle route, etc. Each probe point data object of the determined probe point data object may be associated with a probe point data object identifier which uniquely identifies the probe point data object from one or more other probe point data objects. Additionally, each probe point data object may further include one or more of, a timestamp at which the probe point was generated, a set of coordinates (e.g., latitude and longitude, a relative coordinate system (using an x axis, y axis, and z axis), etc.) a device speed, and/or a device heading value. Furthermore, the associated sensor information may comprise one or more image data objects. For example, the one or more image data objects may be captured using one or more onboard vehicle sensors, such as one or more cameras. Further, the one or more image data objects may correspond to a particular timestamp value.

At block 402 of FIG. 4, the apparatus 10 embodied by a computing device, such as traffic determination engine 205 includes means, such as the processing circuitry 12, or the like, for mapping each probe point data object of the determined probe point data object to a geospatial grid point on a geospatial reference table. A geospatial reference table may be a data construct which is configured to describe one or more attributes of a geographic area. The geospatial reference table may be comprised of a plurality of geospatial grid points, which each correspond to a particular portion of the geographic area. For example, a geospatial reference table may be a grid-like data structure which is overlayed on a particular geographic area. In some embodiments, each geospatial grid point may correspond to a set of coordinates, an associated encompassed geographic area value, one or more associated image data objects pertaining to the geographic area, and/or the like.

Furthermore, each geospatial grid point may be assigned a geospatial grid category. For example, a geospatial grid category may include an off-road segment category and a road segment category. In some embodiments, a geospatial grid category may be assigned manually by one or more authenticated users. Alternatively, the geospatial grid category may be assigned automatically, such as by the traffic determination engine 205 and/or an external computing device, using one or more image processing models configured to process the associated image data objects for the geospatial grid point. In some embodiments, the automatic geospatial grid category determination may be later authenticated by one or more users to confirm the geospatial grid category.

Each probe point data object may be mapped to a geospatial grid point of the geospatial reference table based at least in part on the set of coordinates associated with the probe point data object. The traffic determination engine 205 may be configured to determine which geospatial grid point is associated with the set of coordinates associated with the probe point data object based at least in part on the set of coordinates associated with the geospatial grid point and/or the encompassed geographic area value. For example, a probe point data object may be associated with a set of coordinates which includes a latitude value of 41.90466 and a longitude value of 87.624808. As such, the traffic determination engine 205 may be configured to query the geospatial reference table for a geospatial grid point associated with a set of coordinates which include a latitude value of 41.90466 and a longitude value of 87.624808. Additionally or alternatively, the traffic determination engine 205 may be configured to determine whether a geospatial grid point encompasses the set of coordinates of the probe point data object. For example, the traffic determination engine 205 may be configured to use the set of coordinates associated with the geospatial grid point, which may correspond to a particular location within the geospatial grid point (e.g., center, upper-left corner, etc.) and the encompassed geographic area value (e.g., 100 m$^2$ geographic area value) to determine whether the set of coordinates of the probe point data object are encompassed by the geospatial grid point.

At block 403 of FIG. 4, the apparatus 10 embodied by a computing device, such as traffic determination engine 205 includes means, such as the processing circuitry 12, or the like, for determining an anomalous probe point set. As discussed above in block 402, each probe point data object of the determined probe point data object is mapped to a particular geospatial grid point. Each geospatial grid point is associated with a particular geospatial grid category. For example, a geospatial grid category may include an off-road segment category and a road segment category. In some embodiments, the probe point data object identifier for each probe point data object determined to correspond to an off-road location may be appended to an anomalous probe point set. As such, the traffic determination engine 205 may generate an anomalous probe point set which includes one or more probe point data objects and/or probe point data object identifiers which are mapped to geospatial grid points not associated with a road segment (e.g., are mapped to a geospatial grid point which is assigned an off-road segment category).

In some embodiments, block 403 may be performed in accordance with the various steps/operations of the process 500 depicted in FIG. 5, which is a flowchart diagram of an example process determining whether one or more probe point data objects correspond to an off-road location. Although the set of coordinates associated with each probe point data object may allow for the probe point data object to be mapped to a geospatial grid point of a geospatial reference table, in some instances, where the set of coordinates associated with each probe point data object may be inaccurate, such as in cases where a GPS signal is weak. As such, the probe point data object which is actually captured on an off-road location may be mapped to a geospatial grid point corresponding to a road segment classification due to the erroneous set of coordinates associated with the probe point data object. As such, it may be advantageous to determine whether one or more probe point data objects correspond to an off-road segment and therefore should be included in the anomalous probe point set using one or more additional methods.

At block 501 of FIG. 5, the apparatus 10 embodied by a computing device, such as traffic determination engine 205 includes means, such as the processing circuitry 12, or the like, for determining one or more probe point data object correspond to an off-road location. In some embodiments, the traffic determination engine 205 may determine whether one or more probe point data objects correspond to an off-road location based at least in part on the sensor information associated with each probe point data object. For example, the traffic determination engine 205 may employ one or more image processing models to process the sensor information to determine whether a probe point data object corresponds to an off-road location.

The one or more image processing models may be configured to process sensor information associated with each of the one or more probes using machine learning and/or artificial intelligence-based computer vision algorithms to detect real-world objects. For example, an image processing model may use one or more computer vision algorithms to determine whether a road segment is present, determine the proximity of the vehicle associated with the sensor information with respect to a road segment, detect the presence of one or more off-road attributes (e.g., trees, unpaved terrain, etc.). In some embodiments, the one or more image processing models may be convolution neural network (CNN) models trained to recognize one or more object, object classes, and/or the like. In some embodiments, the one or more image processing models may assign a location confidence score to the probe point data object, where the location confidence score is indicative of the certainty that the probe point corresponds to a location on a road segment. In an instance where the location confidence score fails to satisfy one or more location confidence score thresholds, the traffic determination engine 205 may determine the probe point data object corresponds to an off-road location.

For example, the one or more image processing models may process one or more image data objects (i.e. sensor information) associated with a probe point data object, determine that no road segment is present in the one or more image data objects, and determine a location confidence score of 5% based at least in part on the lack of road segment presence. As such, the traffic determination engine 205 may compare the location confidence score to a location confidence score threshold, such as 50%, and thus determine the location confidence score fails to satisfy one or more location confidence score thresholds and the probe point data object corresponds to an off-road location.

As another example, the one or more image processing models may process one or more image data objects (i.e. sensor information) associated with a probe point data object, and determine that a road segment is present in the one or more image data objects but determine the vehicle (which captured the one or more image data objects using one or more onboard sensors) is not positioned on the road segment but has a proximity of 10 feet from the road segment, and determine a location confidence score of 15% based at least in part on the proximity of the vehicle to the road segment. As such, the traffic determination engine 205 may compare the location confidence score to a location confidence score threshold, such as 50%, and thus determine the location confidence score fails to satisfy one or more location confidence score thresholds and the probe point data object corresponds to an off-road location.

As yet another example, the one or more image processing models may process one or more image data objects (i.e., sensor information) associated with a probe point data object, and one or more off-road attributes are present and no road segment is present and determine a location confidence score of 0% based at least in part on the lack of road segment detection and the confirmation of one or more off-road attributes. As such, the traffic determination engine 205 may compare the location confidence score to a location confidence score threshold, such as 50%, and thus determine the location confidence score fails to satisfy one or more location confidence score thresholds and the probe point data object corresponds to an off-road location.

At block 502 of FIG. 5, the apparatus 10 embodied by a computing device, such as traffic determination engine 205 includes means, such as the processing circuitry 12, or the like, for appending the one or more probe point data objects determined to correspond to an off-road location to the anomalous probe point set. In some embodiments, the probe point data object identifier for each probe point data object determined to correspond to an off-road location may be appended to an anomalous probe point set. As such, the anomalous probe point set may include probe point data objects and/or probe point data object identifiers which are determined to either be associated with a set of coordinates which are mapped to a geospatial grid point not associated with a road segment and/or are determined to correspond to an off-road location, such as by processing the associated sensor information using one or more image processing models.

Returning now to FIG. 4, at block 404 of FIG. 4, the apparatus 10 embodied by a computing device, such as traffic determination engine 205 includes means, such as the processing circuitry 12, or the like, for updating the determined probe point data object to exclude the one or more probe point data objects which belong to the anomalous probe point set. In some embodiments, the traffic determination engine 205 may remove the probe point data objects based at least in part on the probe point data object identifier included in the anomalous probe point set. As such, the determined probe point data object may be updated to remove probe point data objects determined to not be associated with a road segment.

At block 405 of FIG. 4, the apparatus 10 embodied by a computing device, such as traffic determination engine 205 includes means, such as the processing circuitry 12, or the like, for determining one or more traffic conditions for one or more road segments based at least in part on the determined probe point data object. The one or more traffic conditions may be substantially similar to the determinations described with respect to block 304 of FIG. 3. Here, the traffic determination engine 205 may use the determined probe point data object which has been updated to remove probe point data objects determined to not be associated with a road segment (i.e., low quality probe point data objects). As such, traffic conditions may be more reliably and accurately determined as probe point data objects determined to not be associated with a road segment may be removed from consideration during traffic condition determinations.

Additionally or alternatively, in some embodiments, block 304 may be performed in accordance with the various steps/operations of the process 600 depicted in FIG. 6, which is a flowchart diagram of an example process for determining one or more traffic conditions for one or more road segments based at least in part on a validated probe set data object. In some embodiments, the various steps/operations of the process 600 depicted in FIG. 6 may be performed in accordance with the various steps/operations of FIG. 4, such as block 404. For example, the updated determined probe point data object may be used in the process 600 of FIG. 6 in accordance with some embodiments.

At block 601 of FIG. 6, the apparatus 10 embodied by a computing device, such as traffic determination engine 205 includes means, such as the processing circuitry 12, or the like, for identifying two or more sequential probe point data objects. In some embodiments, the traffic determination engine 205 may identify two or more sequential probe point data objects based at least in part on the time stamp associated with each probe point data object. For example, the two or more sequential probe point data objects may be ordered in ascending chronological order. In some embodiments, the traffic determination engine 205 may identify two or more sequential probe point data objects based at least in part on the set of coordinates associated with each probe point data object. For example, the two or more sequential probe point data object may be ordered based at least in part on the GPS coordinates described by the set of coordinates associated with each probe point data object. In some embodiments, the two or more sequential probe point data objects may be identified based at least in part on a receipt timestamp, corresponding to a time when the particular probe point data object was received. In some embodiments, the traffic determination engine 205 may use the determined probe point data object as described with respect to block 304 of FIG. 3 or the updated determined probe point data object as described with respect to block 404 of FIG. 4.

At block 602 of FIG. 6, the apparatus 10 embodied by a computing device, such as traffic determination engine 205 includes means, such as the processing circuitry 12, or the like, for validating the two or more sequential probe point data objects using one or more first validation sequence check operations. In some embodiments, first validation sequence check operations may include one or more of determining whether the two or more sequential probe point data objects are associated with the same timestamp value, determining whether the two or more sequential probe point data objects include the same set of coordinates, and/or determining whether the two or more sequential probe point data objects include a zero value for speed. In some embodiments, the first validation sequence check operation may assign a validation failure category to the two or more sequential probe point data objects in an instance where the two or more sequential probe point data objects are not validated. The validation failure categories that may be assigned by the traffic determination engine 205 using the first validation sequence check operation may include an unchanged timestamp category, a stationary location category, and a moving zeros category.

In an instance where the two or more sequential probe point data objects are associated with the same timestamp value, the two or more sequential probe point data objects may not be validated. This is due to the ambiguity associated with the two probe point data object which correspond to the same time. In instances where the probe point data object timestamp does not change, there is then ambiguity regarding which probe point data object should be used for the timestamp. The traffic determination engine 205 may then assign an unchanged timestamp category as the reason for validation failure.

FIG. 8A depicts an operational example of determined probe point data object 800a with two or more sequential probe point data objects 801 and 802. The two or more sequential probe point data objects 801 and 802 can be seen to be associated with the same timestamp value, and therefore will not be validated by a first validation sequence check operation and will be assigned an unchanged timestamp category as the reason for validation failure.

In an instance where the two or more sequential probe point data objects include the same set of coordinates, the two or more sequential probe point data objects may not be validated. In instances where the two or more sequential probe point data objects include the same set of coordinates, the device has either not moved locations or the set of coordinates associated with the probe point data object is inaccurate. The traffic determination engine 205 may then assign a stationary location category as the reason for validation failure.

FIG. 8B depicts an operational example of determined probe point data object 800b with two or more sequential probe point data objects 803 and 804. The two or more sequential probe point data objects 803 and 804 can be seen to be associated with the same set of coordinates, and therefore will not be validated by a first validation sequence check operation and will be assigned a stationary location category as the reason for validation failure.

In an instance where the two or more sequential probe point data objects include a zero value for speed, the two or more sequential probe point data objects may not be validated. In instances where the two or more sequential probe point data objects include a zero value for the speed, the device has either not moved locations or the probe point data object speed is inaccurate. The traffic determination engine 205 may then assign a moving zeros category as the reason for validation failure.

FIG. 8C depicts an operational example of determined probe point data object 800c with two or more sequential probe point data objects 805 and 806. The two or more sequential probe point data objects 805 and 806 can be seen to be associated with zero values for speed, and therefore will not be validated by a first validation sequence check operation and will be assigned a moving zeros category as the reason for validation failure.

The above described probe point data object validation failure scenarios may occur for any variety of reason. For example, when a device is traveling through a region with limited or no network access, such as through a tunnel, probe point data objects may still be received for the device. However, due to the limited connectivity to the device, one or more values of the probe point data object may be unchanged and/or zeroed. For example, FIG. 8D depicts an operational example of determined probe point data object 800d with two or more sequential probe point data objects 807 and 808 associated with a vehicle traveling through a tunnel. The two or more sequential probe point data objects 807 and 808 can be seen to be associated with zero values for speed, unchanged sets of coordinates (e.g., latitude and longitude values), and an unchanged heading. Therefore, the two or more data objects 807 and 808 will not be validated by a first validation sequence check operation.

In some embodiments, the one or more first validation sequence check operations may be performed in a defined order. An example of this order will be further defined below with respect to FIG. 7.

At block 603 of FIG. 6, the apparatus 10 embodied by a computing device, such as traffic determination engine 205 includes means, such as the processing circuitry 12, or the like, for validating the two or more sequential probe point data objects using one or more second validation sequence check operations. In some embodiments, the traffic determination engine 205 may validate the two or more sequential probe point data objects in an instance where the two or more probe point data objects are validated first using the one or more first validation sequence check operations. Otherwise, the two or more probe point data objects are not further subjected to validation by the one or more second validation sequence check operations. As such, this allows for a more computationally efficient way of determining whether one or more probe point data objects are validated.

In some embodiments, second validation sequence check operations may include one or more ways of determining whether the two or more sequential probe point data objects are determining whether an absolute device speed difference determined based at least in part on the speed values for each of the two or more sequential probe point data objects satisfies one or more device speed difference threshold values and determining whether an estimated device speed determined based at least in part on the set of coordinates for the two or more sequential probe point data objects satisfies one or more estimated device speed difference threshold values. In some embodiments, the second validation sequence check operation may assign a validation failure category to the two or more sequential probe point data objects in an instance where the two or more sequential probe point data objects are not validated. The validation failure categories that may be assigned by the traffic determination engine 205 using the second validation sequence check operation may include speed jump category.

In some embodiments, the traffic determination engine 205 may determine an absolute device speed difference for each of the two or more sequential probe point data objects based at least in part on corresponding device speeds for the two or more sequential probe point data objects. The traffic determination engine 205 may perform one or more mathematical and/or logical operations on the two or more sequential probe point data objects to determine the absolute device speed difference. In some embodiments, the traffic determination engine 205 may calculate the absolute speed difference by taking the absolute value of the difference between the speed values of the speed associated with the first probe point data object and the second probe point data object. For example, if a first probe point data object is associated with a speed value of 70 miles per hour and a second probe point data object is associated with a speed value of 60 miles per hour, the traffic determination engine may calculate an absolute speed difference of 10 miles per hour.

In an instance where the absolute speed difference fails to satisfy one or more device speed difference threshold values, the two or more sequential probe point data objects may not be validated. In some embodiments, the one or more device speed difference threshold values may be a percentage increase and/or decrease of the speed of a probe point data object. For example, if a first probe point data object is associated with a speed value of 70 miles per hour, the one or more device speed difference threshold values may be 15% such that an absolute device speed difference that is above a 15% increase or decrease (i.e., above +/−10.5 miles per hour) may fail to satisfy the one or more device speed difference threshold values. In some embodiments, the one or more device speed difference threshold values may be based at least in part on a time difference between the two or more sequential probe point data objects. For example, two or more sequential probe point data objects associated with a greater time difference between each respective probe point data object may be required to satisfy one or more device speed difference threshold values with a larger variability as compared to two or more sequential probe point data objects associated with a shorter time difference. As such, probe point data objects with large but realistic fluctuations with speed over longer time period may still be validated. In instances where the two or more sequential probe point data objects fail to satisfy one or more device speed difference threshold values, the traffic determination engine 205 may then assign a speed jump category as the reason for validation failure.

In some embodiments, the traffic determination engine 205 may determine an estimated device speed for each of the two or more sequential probe point data objects based at least in part on corresponding coordinate sets for the two or more sequential probe point data objects. The traffic determination engine 205 may perform one or more mathematical and/or logical operations on the two or more sequential probe point data objects to determine the estimated device speed. In some embodiments, the traffic determination engine 205 may calculate the estimated speed based at least in part on the set of coordinates for the two or more sequential probe point data objects and based at least in part on a timestamp for the two or more sequential probe point data objects. For example, if a first probe point data object is associated with a set of coordinates which include a latitude of 48.082802 and a longitude of 11.48788 and a timestamp of 05:07:06 and the second probe point data object is associated with a set of coordinates which include a latitude of 48.082565 and a longitude of 11.487858 and a timestamp of 05:07:07, the traffic determination engine may calculate an estimated speed of 118 miles per hour for the first probe point data object.

In some embodiments, the traffic determination engine 205 may determine an estimated device speed difference for each of the two or more sequential probe point data objects based at least in part on the estimated device speed for the first probe point data object and corresponding device speeds for the other one or more sequential probe point data objects. The traffic determination engine 205 may perform one or more mathematical and/or logical operations on the two or more sequential probe point data objects to determine the estimated device speed difference. In some embodiments, the traffic determination engine 205 may calculate the estimated speed difference by taking the absolute value of the difference between the speed values of the estimated device speed associated with the first probe point data object and the corresponding device speed associated with second probe point data object. For example, if a first probe point data object is associated with an estimated speed value of 118 miles per hour and a second probe point data object is associated with a corresponding device speed value of 105 miles per hour, the traffic determination engine may calculate an estimated device speed difference of 13 miles per hour.

In an instance where the estimated device speed difference fails to satisfy one or more estimated device speed difference threshold values, the two or more sequential probe point data objects may not be validated. In some embodiments, the one or more estimated device speed difference threshold values may be a percentage increase and/or decrease of the speed of a probe point data object. For example, if a first probe point data object is associated with an estimated device speed value of 118 miles per hour, the one or more estimated device speed difference threshold values may be 15% such that an estimated device speed difference that is above a 15% increase or decrease (i.e., above +/−17.7 miles per hour) may fail to satisfy the one or more estimated device speed difference threshold values. In some embodiments, the one or more estimated device speed difference threshold values may be based at least in part on a time difference between the two or more sequential probe point data objects. For example, two or more sequential probe point data objects associated with a greater time difference between each respective probe point data object may be required to satisfy one or more estimated device speed difference threshold values with a larger variability as compared to two or more sequential probe point data objects associated with a shorter time difference. As such, probe point data objects with large but realistic fluctuations with speed over longer time period may still be validated. In instances where the two or more sequential probe point data objects fail to satisfy one or more estimated device speed difference threshold values, the traffic determination engine 205 may then assign a speed jump category as the reason for validation failure.

FIGS. 9A-B depict operational examples of a speed graph associated with one or more probe point data objects. In particular FIG. 9A depicts a device speed as a function of time for one or more probe point data objects which do not experience speed jumps. In contrast, FIG. 9B depicts a device speed as a function of time for one or more probe point data objects which experiences speed jumps. As can be seen in FIG. 9B, two or more probe point data objects which experience unrealistic speed differences result in large speed fluctuations, which may skew device speed determinations during traffic condition determinations and therefore such probe point data objects should not be validated.

FIG. 7 is an operational example illustrating a processing order for which one or more first validation sequence check operations and one or more second validation sequence check operations may be performed.

Beginning at block 701, the apparatus 10 embodied by a computing device, such as traffic determination engine 205 includes means, such as the processing circuitry 12, or the like, for identifying a first probe point data object $P_1$ and second probe point data object $P_2$ as described in block 601 if FIG. 6. The first probe point data object $P_1$ and second probe point data object $P_2$ may each be associated with a timestamp, set of coordinates, heading, and speed as described above. The traffic determination engine 205 may first validate the first probe point data object $P_1$ and second probe point data object $P_2$ using the first validation sequence check operations 712.

At block 702, the apparatus 10 embodied by a computing device, such as traffic determination engine 205 includes means, such as the processing circuitry 12, or the like, for determining whether the timestamp for the first probe point data object $P_1$ matches the timestamp for the second probe point data object $P_2$. In an instance where the timestamp for the first probe point data object $P_1$ matches the timestamp for the second probe point data object $P_2$, the first probe point data object $P_1$ and the second probe point data object $P_2$ are not validated (i.e., are invalid probe point data objects). In an instance where the timestamp for the first probe point data object $P_1$ does not match the timestamp for the second probe point data object $P_2$, the traffic determination engine may proceed to block 703.

At block 703, the apparatus 10 embodied by a computing device, such as traffic determination engine 205 includes means, such as the processing circuitry 12, or the like, for determining whether the set of coordinates for the first probe point data object $P_1$ matches the set of coordinates for the second probe point data object $P_2$. In an instance where the set of coordinates for the first probe point data object $P_1$ matches the set of coordinates for the second probe point data object $P_2$, the first probe point data object $P_1$ and the second probe point data object $P_2$ are not validated (i.e., are invalid probe point data objects). In some embodiments, the block 702 and 703 may be switched in order such that the traffic determination engine 205 may determine whether the set of coordinates for the first probe point data object $P_1$ matches the set of coordinates for the second probe point data object $P_2$ prior to determining whether the timestamp for the first probe point data object $P_1$ matches the timestamp for the second probe point data object $P_2$. In an instance where the set of coordinates for the first probe point data object $P_1$ does not match the set of coordinates for the second probe point data object $P_2$, the traffic determination engine may proceed to block 704.

At block 704, the apparatus 10 embodied by a computing device, such as traffic determination engine 205 includes means, such as the processing circuitry 12, or the like, for determining whether the speed values for the first probe point data object $P_1$ and the second probe point data object $P_2$, are greater than zero. In the instance where speed value of the first probe point data object $P_1$ and speed value of the second probe point data object $P_2$ are not greater than zero, the first probe point data object $P_1$ and the second probe point data object $P_2$, are not validated (i.e., are invalid probe point data objects). In an instance where speed value for the first probe point data object $P_1$ does not match the speed value for the second probe point data object $P_2$, the traffic determination engine may proceed to the second validation sequence check operations 714 beginning at block 705.

At block 705, the apparatus 10 embodied by a computing device, such as traffic determination engine 205 includes means, such as the processing circuitry 12, or the like, for determining an absolute device speed difference as described above.

At block 706, the apparatus 10 embodied by a computing device, such as traffic determination engine 205 includes means, such as the processing circuitry 12, or the like, for determining whether the absolute device speed difference satisfies one or more device speed difference threshold values denoted as X. In the instance where the absolute device speed difference fails to satisfy one or more device speed difference threshold values X, the first probe point data object $P_1$ and the second probe point data object $P_2$ are not validated (i.e., are invalid probe point data objects). In an instance where the absolute device speed difference satisfies the one or more device speed difference threshold values X, the traffic determination engine may proceed to block 707.

At block 707, the apparatus 10 embodied by a computing device, such as traffic determination engine 205 includes means, such as the processing circuitry 12, or the like, for determining an estimated device speed difference as described above.

At block 708, the apparatus 10 embodied by a computing device, such as traffic determination engine 205 includes means, such as the processing circuitry 12, or the like, for determining whether the estimated device speed difference satisfies one or more estimated device speed difference threshold values denoted as Y. In the instance where the estimated device speed difference fails to satisfy one or more estimated device speed difference threshold values estimated Y, the first probe point data object $P_1$ and the second probe point data object $P_2$ are not validated (i.e., are invalid probe point data objects). In an instance where the estimated device speed difference satisfies the one or more estimated device speed difference threshold values Y, the traffic determination engine determined the two or more sequential probe point data objects are valid probe point data objects.

Returning now to FIG. 6, at block 604, the apparatus 10 embodied by a computing device, such as traffic determination engine 205 includes means, such as the processing circuitry 12, or the like, for generating a validated probe point set data object. If the two or more probe point data objects were successfully validated by the one or more first probe point validation sequence check operations and the one or more second probe point validation sequence check operations, the traffic determination engine 205 may generate a validated probe point set data object which includes the probe point data objects and/or probe point data object identifiers for probe point data objects validated by the one or more first probe point validation sequence check operations and the one or more second probe point validation sequence check operations.

In some embodiments, the traffic determination engine 205 may further generate an invalidated probe point set data object which includes probe point data objects and/or probe point data object identifiers for probe point data objects which were not validated by the one or more first probe point validation sequence check operations and the one or more second probe point validation sequence check operations. Furthermore, the traffic determination engine 205 may append the validation failure category associated with the reason for the validation failure of the two or more sequential probe point data objects.

At block 605 of FIG. 6, the apparatus 10 embodied by a computing device, such as traffic determination engine 205 includes means, such as the processing circuitry 12, or the like, for determining one or more traffic conditions for one or more road segments based at least in part on the validated probe point set data object. The one or more traffic conditions may be substantially similar to the determinations described with respect to block 304 of FIG. 3. Here, the traffic determination engine 205 may use the validated probe point data object which includes probe point data objects determined to have passed one or more first validation sequence check operations and one or more second validation sequence check operations. As such, traffic conditions may be more reliably and accurately determined as probe point data objects determined to not be of sufficient quality may be removed from consideration during traffic condition determinations.

As such, the methods, apparatuses and computer program products provided in accordance with example embodiments described above are capable of determination and/or validation of probe point data objects to allow for traffic condition determinations using probe points data objects of a sufficient quality. A determined probe point data object may be updated to exclude one or more probe point data objects determined to correspond to an off-road location and the determined probe point data object may then be used to determine one or more traffic conditions for one or more road segments. As such, probe point data objects which may be associated with an insufficient probe point quality (e.g., probe point data objects which are no associated with a road segment) may be excluded from traffic condition determinations. Additionally or alternatively, in some embodiments, a validated probe point data object may be generated which includes one or more probe point data objects which have been validated using one or more first validation sequence check operations and one or more second validation sequence check operations such that low quality probe point data objects are not included in the validated probe point data object. The validated probe point data object may also be used to determine one or more traffic conditions for one or more road segments. Advantageously determining probe point data objects and/or validating probe point data objects for use in traffic condition determinations allows for more accurate traffic condition determinations by excluding probe point data objects which are of insufficient quality. Additionally, the exclusion of probe points of insufficient quality allows for traffic condition determinations to be made in a more computationally effective and efficient manner by reducing the overall number of considered probe points.

FIGS. 3-7 illustrate flowcharts of an apparatus, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 16 of an apparatus 10 employing an embodiment of the present invention and executed by a processing circuitry 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method for probe point validation, the method comprising:

receiving, from a mobile device, two or more sequential probe point data objects corresponding to a unique device identifier, wherein the mobile device comprises a mobile phone, an in-vehicle navigation system, or an advanced driving assistance system (ADAS);

determining whether the two or more sequential probe point data objects are valid based on one or more first validation sequence check operations;

responsive to determining that the two or more sequential probe point data objects are valid based on the one or more first validation sequence check operations, determining whether the two or more sequential probe point data objects are valid based on one or more second validation sequence check operations;

responsive to determining that the two or more sequential probe point data objects are valid based on the one or more second validation sequence check operations, generating a validated probe point set data object comprising the two or more sequential probe point data objects;

determining one or more traffic conditions for one or more road segments based at least in part on the validated probe point set data object; and using, by a computing entity, the one or more traffic conditions that are determined for at least one of a determination of a navigational route, an estimation of a time of arrival or event planning for a road segment, wherein the one or more first validation sequence check operations and the one or more second validation sequence check operations are configured to determine whether a quality of the two or more sequential probe point data objects will affect the accuracy of determining the one or more traffic conditions for the one or more road segments.

2. The method of claim 1, wherein:

the two or more sequential probe point data objects are not validated by the one or more first validation sequence check operations in an instance the two or more sequential probe point data objects comprise the same timestamp.

3. The method of claim 1, wherein the two or more sequential probe point data objects are not validated by the first validation sequence check operation in an instance the two or more sequential probe point data objects comprise the same set of coordinates.

4. The method of claim 1, wherein the two or more sequential probe point data objects are not validated by the first validation sequence check operation in an instance the two or more sequential probe point data objects comprise zero value speeds.

5. The method of claim 1, the method further comprising determining an absolute device speed difference for each of the two or more sequential probe point data objects based at least in part on corresponding device speeds for the two or more sequential probe point data objects.

6. The method of claim 5, wherein the two or more sequential probe point data objects are not validated by the second validation sequence check operation in an instance the absolute device speed difference fails to satisfy one or more device speed difference threshold values.

7. The method of claim 5, the method further comprising:

determining an estimated device speed based at least in part on the set of coordinates for the two or more sequential probe point data objects; and determining an estimated device speed difference based at least in part on the absolute device speed and the estimated device speed.

8. The method of claim 7, wherein the two or more sequential probe point data objects are not validated by the second validation sequence check operation in an instance the estimated device speed difference fails to satisfy one or more estimated device speed difference threshold values.

9. The method of claim 1, wherein each probe point data object comprises one or more of a timestamp at which the probe point data object was generated by the device, a set of coordinates, a device speed, and a device heading value.

10. The method of claim 1, wherein the one or more first validation sequence check operations comprise:

determining whether the two or more sequential probe point data objects are associated with a same timestamp value, determining whether the two or more sequential probe point data objects comprise a same set of coordinates, or determining whether the two or more sequential probe point data objects comprise a zero value for device speed.

11. The method of claim 1, wherein the one or more second validation sequence check operations comprise:

determining an absolute device speed difference for respective ones of the two or more sequential probe point data objects based at least in part on corresponding device speeds for the two or more sequential probe point data objects, and determining whether the absolute device speed difference satisfies one or more device speed difference threshold values.

12. An apparatus comprising:

at least one processor; and at least one memory including computer program code, the at least one memory and the computer program code configured to, with the at least one processor, cause the apparatus at least to:

receive, from a mobile device, two or more sequential probe point data objects corresponding to a unique device identifier, wherein the mobile device comprises a mobile phone, an in-vehicle navigation system, or an advanced driving assistance system (ADAS);

determine whether the two or more sequential probe point data objects are valid based on one or more first validation sequence check operations;

responsive to determining that the two or more sequential probe point data objects are valid based on the one or more first validation sequence check operations, determine whether the two or more sequential probe point data objects are valid based on one or more second validation sequence check operations;

responsive to determining that the two or more sequential probe point data objects are valid based on the one or more second validation sequence check operations, generate a validated probe point set data object comprising the two or more sequential probe point data objects;

determine one or more traffic conditions for one or more road segments based at least in part on the validated probe point set data object; and use, by a computing entity, the one or more traffic conditions that are determined for at least one of a determination of a navigational route, an estimation of a time of arrival or event planning for a road segment, wherein the one or more first validation sequence check operations and the one or more second validation sequence check operations are configured to determine whether a quality of the two or more sequential probe point data objects will affect the accuracy of determining the one or more traffic conditions for the one or more road segments.

13. The apparatus of claim 12, wherein the two or more sequential probe point data objects are not validated by the first validation sequence check operation in an instance the two or more sequential probe point data objects comprise the same set of coordinates.

14. The apparatus of claim 12, wherein the two or more sequential probe point data objects are not validated by the first validation sequence check operation in an instance the two or more sequential probe point data objects comprise zero value speeds.

15. The apparatus of claim 12, wherein the at least one memory and the computer program code are further configured to, with the at least one processor, cause the apparatus to determine an absolute device speed difference for each of the two or more sequential probe point data objects based at least in part on corresponding device speeds for the two or more sequential probe point data objects.

16. The apparatus of claim 15, wherein the two or more sequential probe point data objects are not validated by the second validation sequence check operation in an instance the absolute device speed difference fails to satisfy one or more device speed difference threshold values.

17. The apparatus of claim 12, wherein the at least one memory and the computer program code are further configured to, with the at least one processor, cause the apparatus to:

determine an estimated device speed based at least in part on the set of coordinates for the two or more sequential probe point data objects; and determine an estimated device speed difference based at least in part on the absolute device speed and the estimated device speed.

18. The apparatus of claim 17, wherein the two or more sequential probe point data objects are not validated by the second validation sequence check operation in an instance the estimated device speed difference fails to satisfy one or more estimated device speed difference threshold values.

19. The apparatus of claim 12, wherein each probe point data object comprises one or more of a timestamp at which the probe point data object was generated by the device, a set of coordinates, a device speed, or a device heading value.

20. A computer program product comprising at least one non-transitory computer-readable storage medium having computer-executable program code portions stored therein, the computer-executable program code portions comprising program code instructions configured to:

receive, from a mobile device, two or more sequential probe point data objects corresponding to a unique device identifier, wherein the mobile device comprises a mobile phone, an in-vehicle navigation system, or an advanced driving assistance system (ADAS);

determine whether the two or more sequential probe point data objects are valid based on one or more first validation sequence check operations;

responsive to determining that the two or more sequential probe point data objects are valid based on the one or more first validation sequence check operations, determine whether the two or more sequential probe point data objects are valid based on one or more second validation sequence check operations;

responsive to determining that the two or more sequential probe point data objects are valid based on the one or more second validation sequence check operations, generate a validated probe point set data object comprising the two or more sequential probe point data objects;

determine one or more traffic conditions for one or more road segments based at least in part on the validated probe point set data object; and use, by a computing entity, the one or more traffic conditions that are determined for at least one of a determination of a navigational route, an estimation of a time of arrival or event planning for a road segment, wherein the one or more first validation sequence check operations and the one or more second validation sequence check operations are configured to determine whether a quality of the two or more sequential probe point data objects will affect the accuracy of determining the one or more traffic conditions for the one or more road segments.

\* \* \* \* \*